United States Patent
Ueda et al.

(10) Patent No.: US 7,529,632 B2
(45) Date of Patent: May 5, 2009

(54) DRIVING FORCE CALCULATING DEVICE, DRIVING FORCE CALCULATING METHOD, POWER ASSISTING DEVICE, DRIVING FORCE CALCULATING PROGRAM, AND COMPUTER-READABLE STORAGE MEDIUM

(75) Inventors: Jun Ueda, Ikoma (JP); Tsukasa Ogasawara, Ikoma (JP); Ming Ding, Ikoma (JP)

(73) Assignee: National University Corporation Nara Institute of Science and Technology, Nara (JP)

( * ) Notice: Subject to any disclaimer, the term of this patent is extended or adjusted under 35 U.S.C. 154(b) by 0 days.

(21) Appl. No.: 12/068,282

(22) Filed: Feb. 5, 2008

(65) Prior Publication Data
US 2008/0216592 A1    Sep. 11, 2008

Related U.S. Application Data

(60) Provisional application No. 60/900,097, filed on Feb. 8, 2007.

(51) Int. Cl.
*G01L 1/00* (2006.01)
*G01L 3/00* (2006.01)

(52) U.S. Cl. .............. 702/44; 702/33; 702/41; 702/42; 702/43; 73/865.4; 700/260; 700/261; 600/25

(58) Field of Classification Search ............ 702/33, 702/41–44; 700/260–261; 73/865.4; 600/25
See application file for complete search history.

(56) References Cited

U.S. PATENT DOCUMENTS

2008/0161937 A1* 7/2008 Sankai .............. 623/25

FOREIGN PATENT DOCUMENTS

| JP | 07-313495 | 12/1995 |
|---|---|---|
| JP | 2000-51289 | 2/2000 |
| JP | 2004-105261 | 4/2004 |
| WO | 2006/092872 | 9/2006 |

* cited by examiner

*Primary Examiner*—Tung S Lau
*Assistant Examiner*—Sujoy K Kundu
(74) *Attorney, Agent, or Firm*—Harness, Dickey & Pierce, P.L.C.

(57) ABSTRACT

A driving force calculating device (1) includes: a setting information acquiring section (23) which acquires (a) muscle specifying information that specifies a target muscle, which is a muscle whose function is assisted or resisted by a driving section and (b) a target value of muscle force to be produced by the target muscle at the time of rotational motion under assistance or resistance of the driving section; and a target muscle force evaluating section (24) which acquires an estimated muscle force table (58) and musculoskeletal model data (53) and evaluates the feasibility of the target value of the target muscle. With this arrangement, it is possible to reduce time required to calculate a driving force of the driving section of the power assisting device.

7 Claims, 12 Drawing Sheets

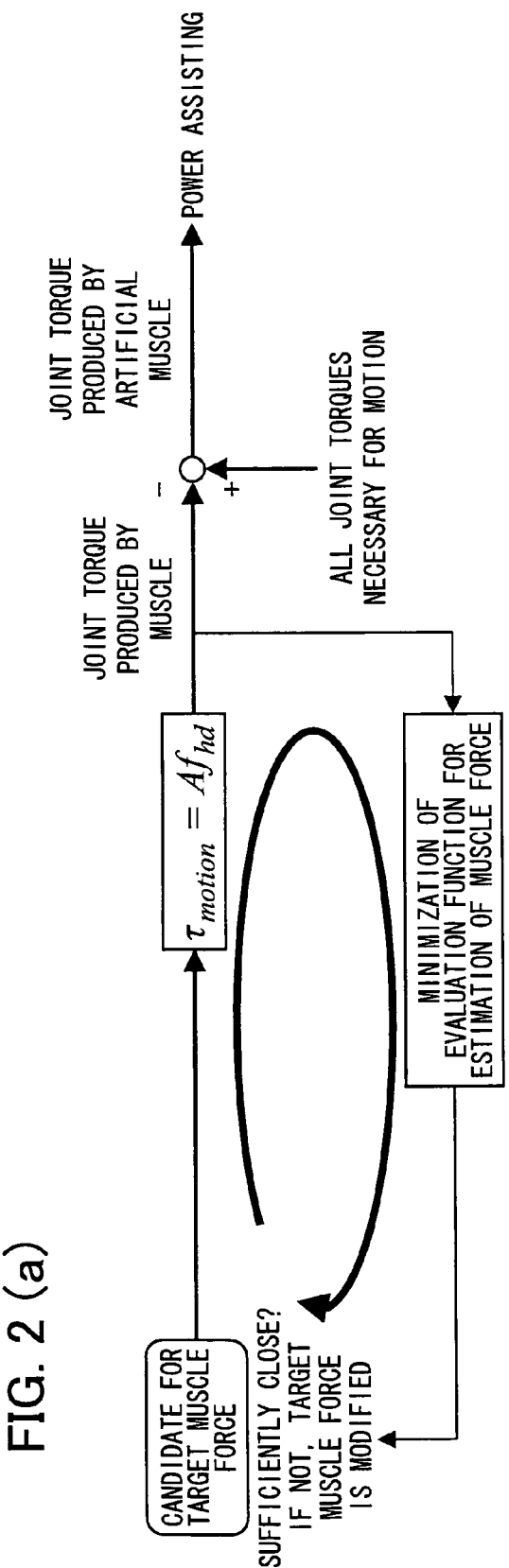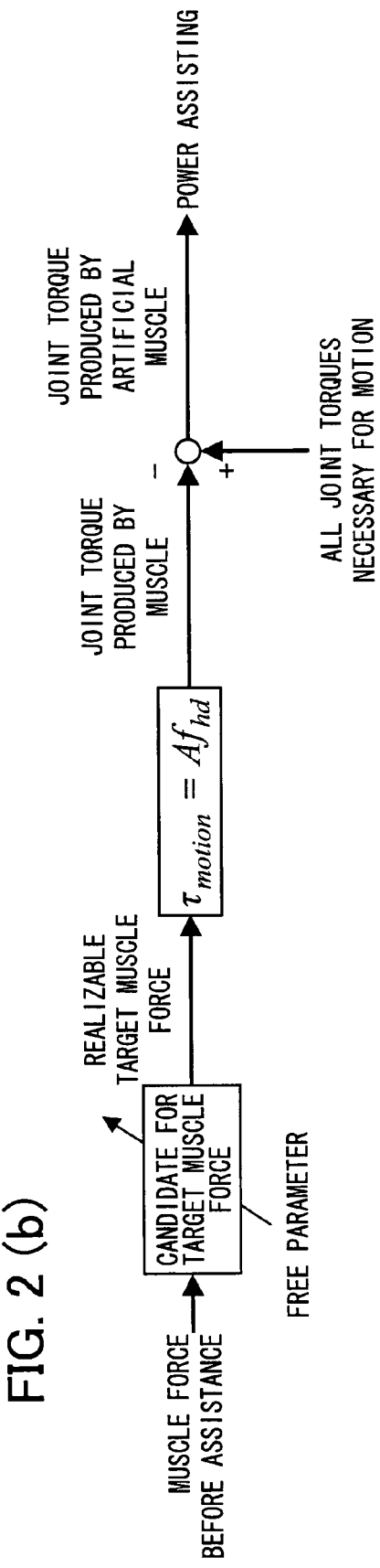
FIG. 2 (a)
FIG. 2 (b)

82

— BICEPS BRACHII MUSCLE (LONG HEAD)
--- BICEPS BRACHII MUSCLE (SHORT HEAD)
— BRACHIALIS MUSCLE
••••••• BRACHIORADIALIS MUSCLE
—·—· TRICEPS BRACHII MUSCLE (LONG HEAD)
—··— TRICEPS BRACHII MUSCLE (INTERNAL HEAD)
·········· TRICEPS BRACHII MUSCLE (EXTERNAL HEAD)
——— ANCONEUS MUSCLE
------ FLEXOR CARPI ULNARIS MUSCLE
------ FLEXOR CARPI RADIALIS MUSCLE
—··—·· PALMARIS LONGUS MUSCLE

FIG. 12

| | PHYSIOLOGICAL CROSS SECTIONAL AREAS FOR MUSCLES OF UPPER LIMB ||||||||
|---|---|---|---|---|---|---|---|---|
| | MUSCLE NAMES | [mm²] | | MUSCLE NAMES | [mm²] | | MUSCLE NAMES | [mm²] |
| 1 | LEVATOR SCAPULAE MUSCLE | 283 | 18 | DELTOID MUSCLE (EXTERNAL HEAD) | 863 | 35 | PALMARIS LONGUS MUSCLE | 76 |
| 2 | PECTORALIS MAJOR MUSCLE 1 | 452 | 19 | DELTOID MUSCLE (POSTERIOR HEAD) | 863 | 36 | FLEXOR DIGITORUM SUPERFICIALIS MUSCLE 1 | 309 |
| 3 | PECTORALIS MAJOR MUSCLE 2 | 407 | 20 | SUPRASPINATUS MUSCLE | 521 | 37 | FLEXOR DIGITORUM SUPERFICIALIS MUSCLE 2 | 309 |
| 4 | PECTORALIS MINOR MUSCLE | 487 | 21 | INFRASPINATUS MUSCLE | 951 | 38 | FLEXOR DIGITORUM PROFUNDUS MUSCLE | 790 |
| 5 | SUBCLAVIUS MUSCLE | 200 | 22 | TERES MAJOR MUSCLE | 1020 | 39 | FLEXOR POLLICIS LONGUS MUSCLE | 336 |
| 6 | SERRATUS ANTERIOR MUSCLE 1 | 700 | 23 | TERES MINOR MUSCLE | 292 | 40 | PRONATOR QUADRATUS MUSCLE | 263 |
| 7 | SERRATUS ANTERIOR MUSCLE 2 | 700 | 24 | CORACOBRACHIALIS MUSCLE | 251 | 41 | ABDUCTOR POLLICIS LONGUS MUSCLE | 367 |
| 8 | TRAPEZIUS MUSCLE 1 | 530 | 25 | BICEPS BRACHII MUSCLE (LONG HEAD) | 321 | 42 | PRONATOR RETES MUSCLE | 337 |
| 9 | TRAPEZIUS MUSCLE 2 | 530 | 26 | BICEPS BRACHII MUSCLE (SHORT HEAD) | 308 | 43 | EXTENSOR CARPI ULNARIS MUSCLE | 200 |
| 10 | TRAPEZIUS MUSCLE 3 | 530 | 27 | BRACHIALIS MUSCLE | 840 | 44 | EXTENSOR CARPI RADIALIS LONGUS MUSCLE | 287 |
| 11 | RHOMBOID MAJOR MUSCLE | 314 | 28 | BRACHIORADIALIS MUSCLE | 470 | 45 | EXTENSOR CARPI RADIALIS BREVIS MUSCLE | 396 |
| 12 | RHOMBOID MINOR MUSCLE | 314 | 29 | TRICEPS BRACHII MUSCLE (LONG HEAD) | 230 | 46 | EXTENSOR DIGITORUM MUSCLE | 485 |
| 13 | LATISSIMUS DORSI MUSCLE 1 | 283 | 30 | TRICEPS BRACHII MUSCLE (INTERNAL HEAD) | 230 | 47 | EXTENSOR DIGITI MINIMI MUSCLE | 181 |
| 14 | LATISSIMUS DORSI MUSCLE 2 | 283 | 31 | TRICEPS BRACHII MUSCLE (EXTERNAL HEAD) | 230 | 48 | EXTENSOR INDICIS MUSCLE | 178 |
| 15 | LATISSIMUS DORSI MUSCLE 3 | 283 | 32 | ANCONEUS MUSCLE | 250 | 49 | EXTENSOR POLLICIS LONGUS MUSCLE | 146 |
| 16 | SUBSCAPULARIS MUSCLE | 1351 | 33 | FLEXOR CARPI ULNARIS MUSCLE | 626 | 50 | EXTENSOR POLLICIS BREVIS MUSCLE | 134 |
| 17 | DELTOID MUSCLE (ANTERIOR HEAD) | 863 | 34 | FLEXOR CARPI RADIALIS MUSCLE | 360 | 51 | SUPINATOR MUSCLE | 470 |

DRIVING FORCE CALCULATING DEVICE, DRIVING FORCE CALCULATING METHOD, POWER ASSISTING DEVICE, DRIVING FORCE CALCULATING PROGRAM, AND COMPUTER-READABLE STORAGE MEDIUM

This nonprovisional application claims the benefit under 35 USC Section 119(e) of U.S. Provisional Application No. 60/900,097 filed on Feb. 8, 2007, the entire contents of which are hereby incorporated by reference.

FIELD OF THE INVENTION

The present invention relates to: a driving force calculating device and a driving force calculating method each of which calculate a driving force of a driving section of a power assisting device that assists and/or resists a motion of a joint of a living body; and a power assisting device including the driving force calculating device.

BACKGROUND OF THE INVENTION

In accordance with rapid aging of the population in recent years, there are increasing needs for welfare assistive devices that support caring of aged persons in the field of welfare. The most burdensome work in the field of caring is moving a cared person or adjusting the posture of the cared person. Much attention is paid to care-oriented power assisting devices that alleviate a load applied on the muscle force of a caregiver who makes such movement or adjustment.

For example, Japanese Unexamined Patent Publication No. 2000-51289 (Tokukai 2000-51289; published on Feb. 22, 2000) discloses a care-oriented power assisting device that functions with use of an air pressure actuator having a light weight and a small size.

Further, Japanese Unexamined Patent Publication No. 2004-105261 (Tokukai 2004-105261; published on Apr. 8, 2004) discloses a power assisting instrument with a downsized structure that alleviates a load applied on human muscles.

Other examples of power assisting devices include BLEEX developed by Kazerooni et al. of University of California and HAL manufactured by Sankai et al. of University of Tsukuba.

Furthermore, International Application Publication (International Publication 2006/092872 pamphlet; published on Sep. 8, 2006) discloses a driving force calculating device capable of calculating a driving force that allows a desired load to be applied on a muscle at a time when a power assisting device aids/prevents a predetermined motion.

These power assisting devices are also effective for muscle training with alleviated or added loads on muscles in the field of sports engineering and rehabilitation engineering.

In order to develop a new method for evaluating athletic abilities or a new rehabilitation method, much studies have been made in the field of sports engineering and rehabilitation engineering as to estimation of muscle activities of humans in motion.

For example, Japanese Unexamined Patent Publication No. 1995-313495 (Tokukaihei 7-313495; published on Dec. 5, 1995) discloses a technique in which athletic properties of a subject who operates an exercise device are measured, and inverse analysis is used to estimate the muscle force of a living body.

Examples of commercially available software for estimating the muscle force of a living body that performs a certain motion include "ARMO" that is a 3 D muscle simulator manufactured by Gsport Inc., and "SIMM" that is a musculoskeletal model of a whole body manufactured by Musculographics Inc.

It is desirable that a power assisting device worn by a caregiver allows individual regulation of loads applied on respective muscles in consideration of muscular properties, in order that unnatural loads are not applied on the caregiver.

Further, in order to increase a rehabilitation effect for a handicapped person, it is desirable to classify individual muscles into muscles on which loads are to be applied and muscles on which loads are not to be applied, and regulate loads applied on the individual muscles so as to selectively assist the muscles on which loads are not to be applied. Equally, it is desirable to selectively apply loads on the muscles on which loads are to be applied in muscle training.

However, neither of Japanese Unexamined Patent Publication No. 2000-51289 and Japanese Unexamined Patent Publication No. 2004-105261 disclose a technique for regulating each of loads applied on individual muscles while a power assisting device assists a predetermined motion. Further, BLEEX and HAL as mentioned above do not have a mechanism for regulating each of loads applied on individual muscles.

In contrast, applying the driving force calculating device disclosed in International Publication 2006/092872 pamphlet to a power assisting device would allow regulating each of loads applied on individual muscles at a time when a user performs a predetermined motion. The driving force calculating device operates as follows: the user enters a target muscle force to be generated for a particular muscle, and a driving force of a driving section (artificial muscle) of a power assisting device is calculated based on the target muscle force and torque of a joint that is necessary for the predetermined motion.

However, in a case of using the driving force calculating device, it is necessary to enter a target muscle force not only for a muscle to be aided by the power assisting device but also for a muscle not to be aided by the power assisting device. Furthermore, when a combination of muscle forces calculated by the driving force calculating device is much different from a target value, it is necessary to reset the target muscle force.

Therefore, the driving force calculating device has problems such that it takes much time to calculate the driving force of the driving section of the power assisting device and that the calculation does not always results in a suitable driving force.

SUMMARY OF THE INVENTION

The present invention has been attained to solve the above problem. An object of the present invention is to provide driving force calculating device which reduces a time required for calculation of driving force of a driving section of a power assisting device, and calculates driving force of the driving section so that muscle force of muscle to be assisted (or resisted) by the power assisting device is closer to a target value.

In order to achieve the above object, a driving force calculating device of the present invention is a driving force calculating device for calculating a driving force of a driving section of a power assisting device which section is fixed to bones producing motions through corresponding muscles across a joint between the bones, so that the power assisting device assists and/or resists a skeletal motion of the joint, the driving force calculating device including: acquiring means which acquires (a) muscle specifying information that specifies a target muscle, and (b) a target value of muscle force to be produced by the target muscle indicated by the muscle specifying information at the time when the motion is produced under assistance or resistance of the driving section, the target muscle being a muscle whose function is assisted or resisted by the driving section; and target value evaluating means which acquires (i) estimated values of muscle forces of muscles involved in the motion without assistance and resistance of the driving section and (ii) three-dimensional structural information indicative of relative positions of muscles and bones of a living body, and evaluates feasibility of the target value of the target muscle indicated by the muscle specifying information in accordance with the estimated values and the three-dimensional structural information.

A driving force calculating method of the present invention is a driving force calculating method of a driving force calculating device for calculating a driving force of a driving section of a power assisting device which section is fixed to bones producing motions through corresponding muscles across a joint between the bones, so that the power assisting device assists and/or resists a skeletal motion of the joint, the including acquiring means and target value evaluating means, the method including: acquiring step of the acquiring means acquiring (a) muscle specifying information that specifies a target muscle, and (b) a target value of muscle force to be produced by the target muscle indicated by the muscle specifying information at the time when the motion is produced under assistance or resistance of the driving section, the target muscle being a muscle whose function is assisted or resisted by the driving section; and target value evaluating step of the target value evaluating means acquiring (i) estimated values of muscle forces of muscles involved in the motion without assistance and resistance of the driving section and (ii) three-dimensional structural information indicative of relative positions of muscles and bones of a living body, and evaluates feasibility of the target value of the target muscle indicated by the muscle specifying information in accordance with the estimated values and the three-dimensional structural information.

Conventionally, a plurality of processes were performed stepwise to calculate driving force of the driving section corresponding to a target value of a target muscle. After the calculation of the driving force of the driving section, it was evaluated whether muscle force of the target muscle realized by the calculated driving force differs from the target value. Therefore, in a case where the target value of the target muscle is unfeasible, it takes much time to notify the user of it.

With the above arrangement, the target value evaluating means evaluates the feasibility of the target value of the target muscle indicated by the muscle specifying information acquired by the acquiring means, in accordance with the estimated values and the three-dimensional structural information. That is, the target value evaluating means evaluates the feasibility of the target value of the target muscle, without calculating a driving force of the driving section.

Therefore, it is possible to evaluate the feasibility of the target value of the target muscle in a time shorter than was previously possible. This makes it possible to reduce a time required for the calculation of a driving force of the driving section.

A power assisting device of the present invention is a power assisting device including a driving section which is fixed to bones producing motions through corresponding muscles across a joint between the bones, so as to assist and/or resist a skeletal motion of the joint, the power assisting device further including: the above driving force calculating device, wherein the driving section produces driving force calculated by the driving force calculating device.

With the above arrangement, it is possible to calculate a driving force of the driving section and produce the driving force in a time shorter than was previously possible.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 2(a) is a view schematically illustrating the conventional invention, and FIG. 2(b) is a view illustrating outline of the present invention.

FIG. 12 is a table illustrating serial numbers for muscles.

DESCRIPTION OF EMBODIMENTS

Embodiment 1

Figure 1:
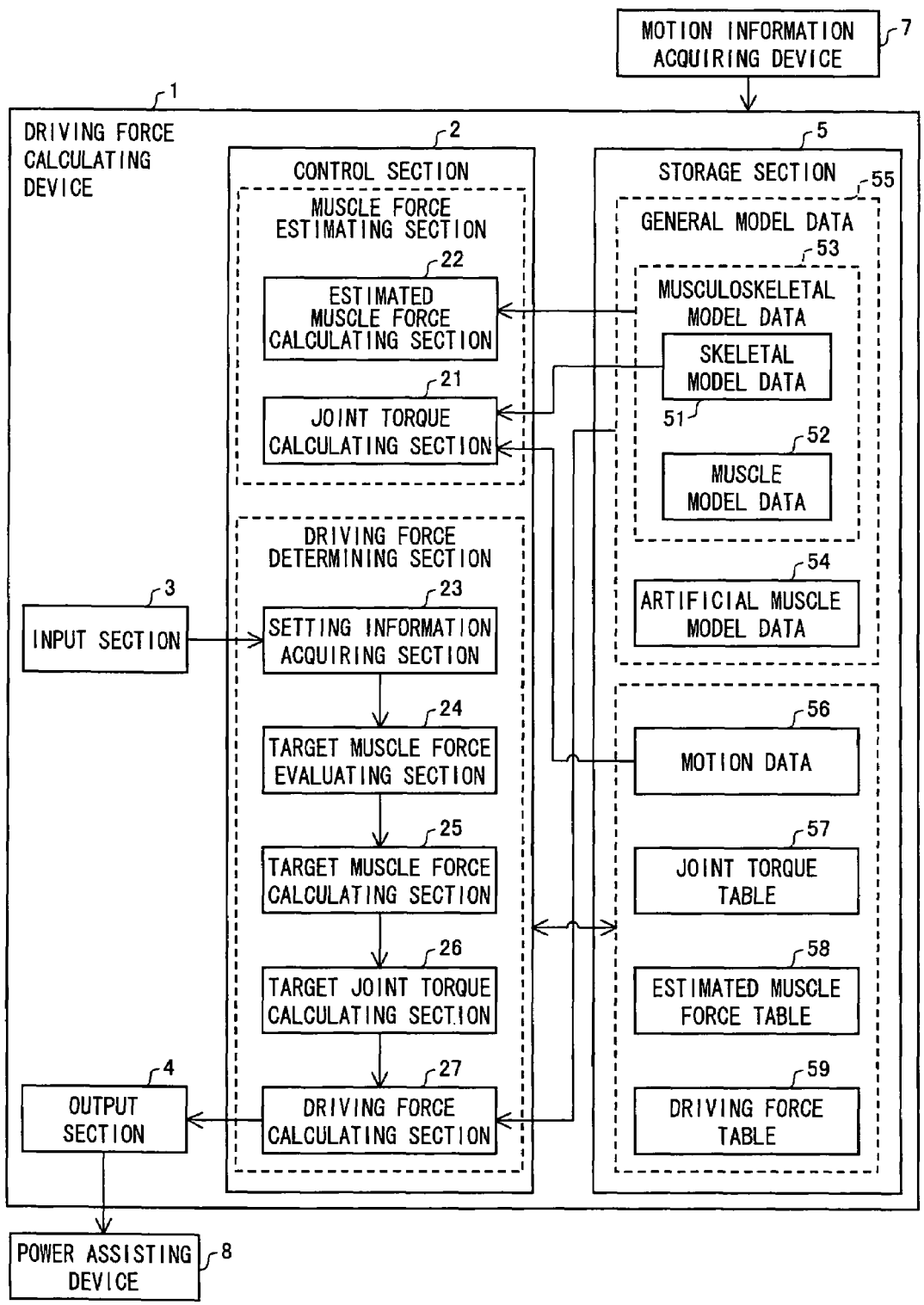
FIG. 1 is a functional block diagram illustrating the structure of a driving force calculating device included in a power assisting system according to an embodiment of the present invention.

The following explains an embodiment of the present invention with reference to FIGS. 1 to 12.

(Difference between Present Invention and Conventional Invention)

First, difference between the present invention and the invention disclosed in International Publication 2006/092872 pamphlet (hereinafter referred to as "conventional invention") is explained below with reference to FIG. 2.

A human body has a redundant number of muscles compared with that of joints. Theoretically, there are two muscles that contribute to motion of a one-degree-of-freedom joint (one muscle for bending and the other for stretching, because the muscles can only pull). However, generally much more muscles are disposed. Muscle forces generated by human muscles are determined in accordance with an optimization principle (proposed by Crowninshield). According to this principle, each combination of muscle forces of muscles to carry out a target motion is determined by minimizing a value of a evaluation function. The evaluation function is a sum of values each being obtained by first dividing the muscle force of the muscle by physiologic cross sectional area (PSCA) of the muscle and then raising the result of the division to the r-th power. This evaluation function is expressed by the following formulae (1) through (3):

$$u(f) = \sum_{j=1}^{n} \left(\frac{f_j}{PCSAj}\right)^r \to \min \quad (1)$$

$$\tau = Af \quad (2)$$

$$f_{j\min} \le f_j \le f_{j\max} \quad (3)$$

Therefore, a muscle force distribution that deviates from this principle cannot be realized even with the best control of a power assisting device.

The conventional invention intends to find a combination of forces that satisfy the "optimization principle" with the use of a driving force calculating device. This driving force calculating device outputs a muscle force that satisfies the "optimization principle", when provided with a joint torque.

As illustrated in FIG. 2(a), according to the conventional invention, a combination of target values of muscle forces is inputted compulsorily into the driving force calculating device. The driving force calculating device calculates a driving force of a driving section on the basis of the target values and a joint torque necessary for a rotational motion. However, information on all muscle forces is required for calculation of the joint torque. Accordingly, in addition to the target values of the muscle forces, some kinds of target values should also be assigned to muscles that are not targeted. In a case where the calculation by the driving force calculating device results in a combination of muscle forces that is far from the target values, the target values of the muscle forces are to be newly set again.

Because the target values need to be assigned to all muscles as explained above, considerable labor is necessary for calculation of the driving force of the driving section. Moreover, because there is no specific guideline to set the target values, an engineer sets the target values by trial and error, but a satisfactory result cannot be always attained.

On the other hand, according to the present invention, as illustrated in FIG. 2(b), feasible target values of muscle forces to be generated by muscles that are not to be assisted by a power assisting device are calculated from the target values of muscle forces to be generated by the muscles that are to be assisted by the power assisting device among the muscles responsible for a target motion. The power assisting device is controlled on the basis of these target values.

(Structure of Power Assisting System 10)

Figure 3:
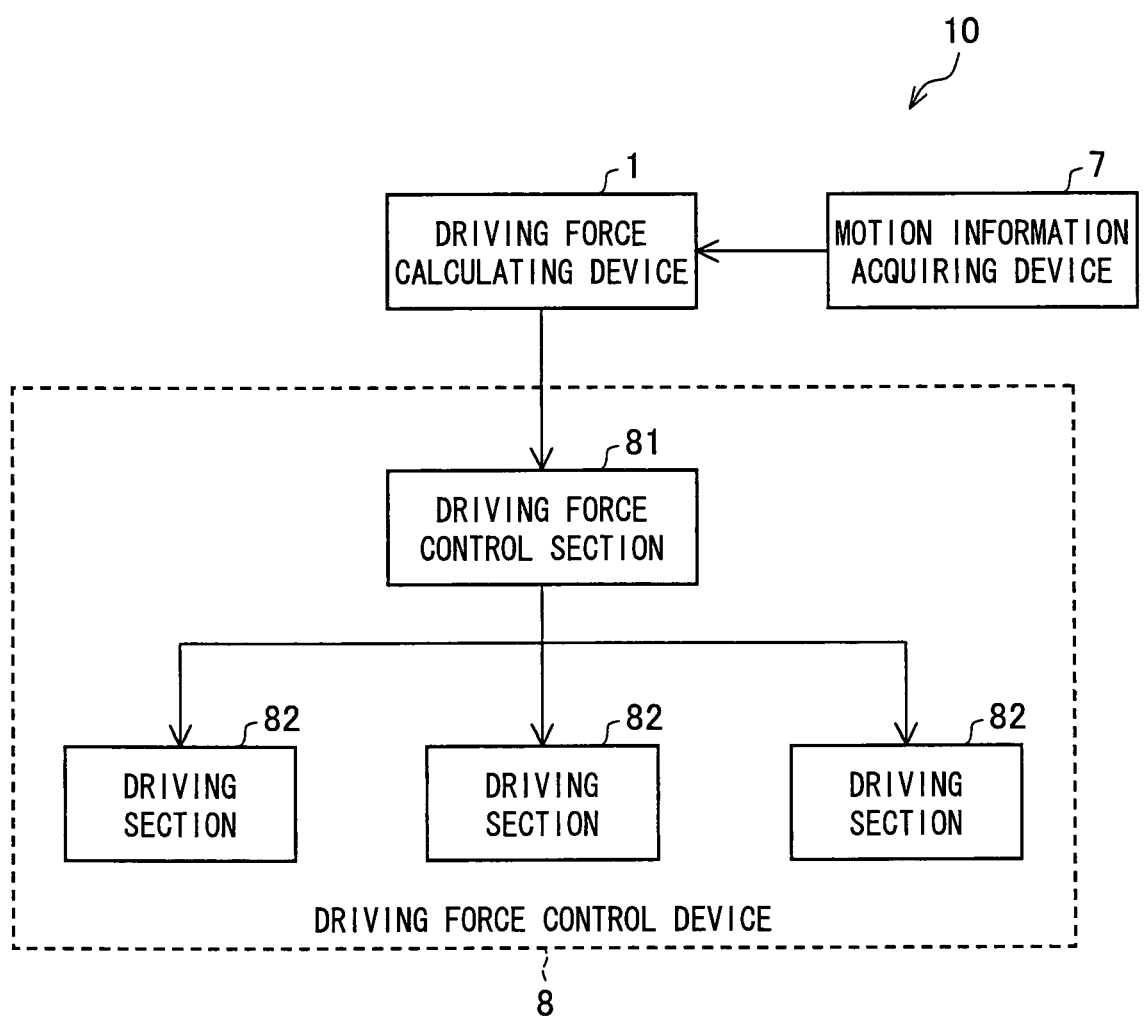
FIG. 3 is a functional block diagram illustrating the structure of a power assisting system according to the embodiment of the present invention.

FIG. 3 is a functional block diagram of the power assisting device 10. As illustrated in FIG. 3, the power-assisting system 10 includes a driving force calculating device 1, a power assisting device 8, and a motion information acquiring device 7.

(Structure of Power Assisting Device 8)

Figure 4:
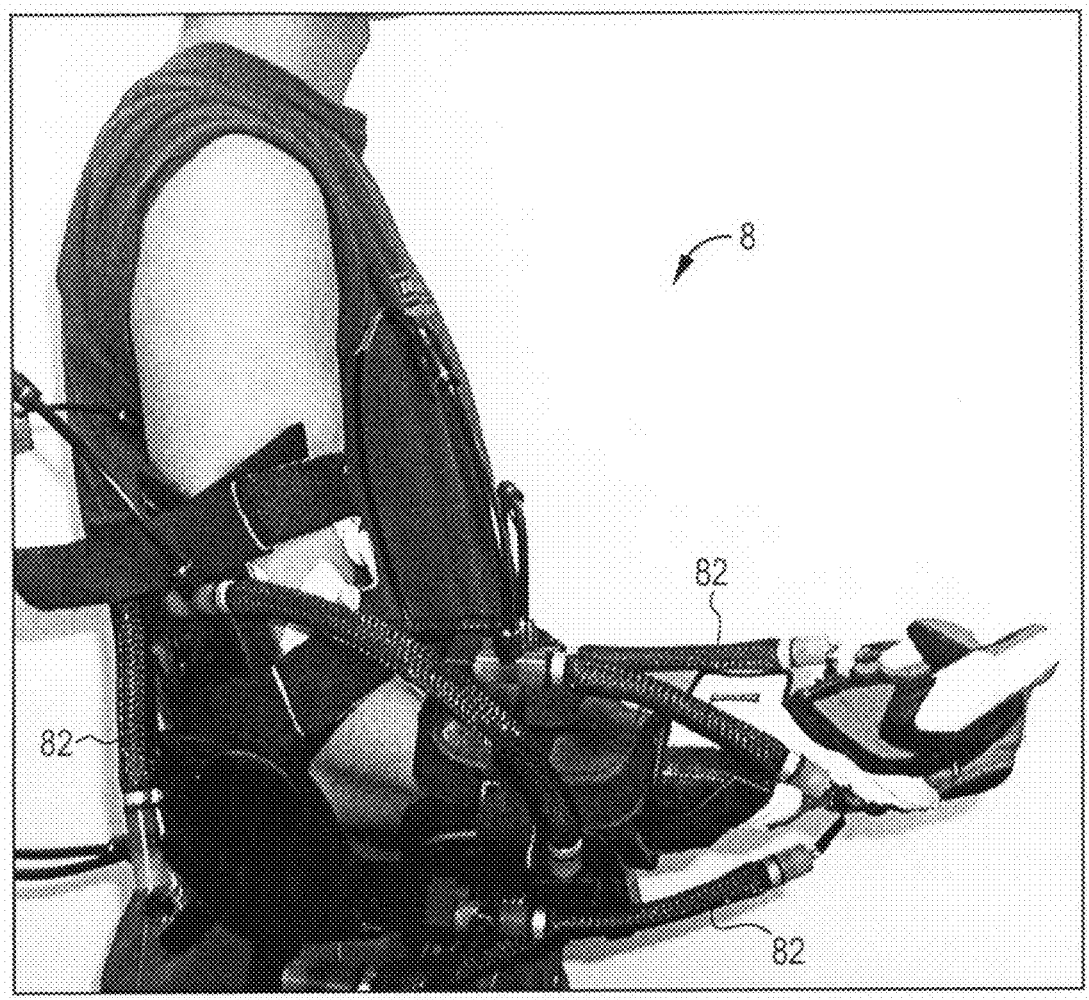
FIG. 4 is a view illustrating one example of a power assisting device included in the power assisting system.

The power assisting device 8 assists and/or resists function of a specific muscles (hereinafter, referred to as target muscles) among muscles that produces a rotational motion of a specific joint (hereinafter, referred to as a target joint) in a living body (human in the present embodiment). The power assisting device 8 is worn by the living body. FIG. 4 shows an example of the power assisting device 8. The power assisting device 8 in FIG. 4 assists or resists a rotational motion of a joint of a user's arm. However, the power assisting device 8 of the present invention is not limited to this example shown in FIG. 4.

The power assisting device 8 includes a plurality of driving sections 82. Each of the driving sections 82 is fixed to bones of the user across the joint. Although FIG. 3 shows three driving sections 82 for convenience, the number of driving sections 82 is not specifically limited.

Figure 5:
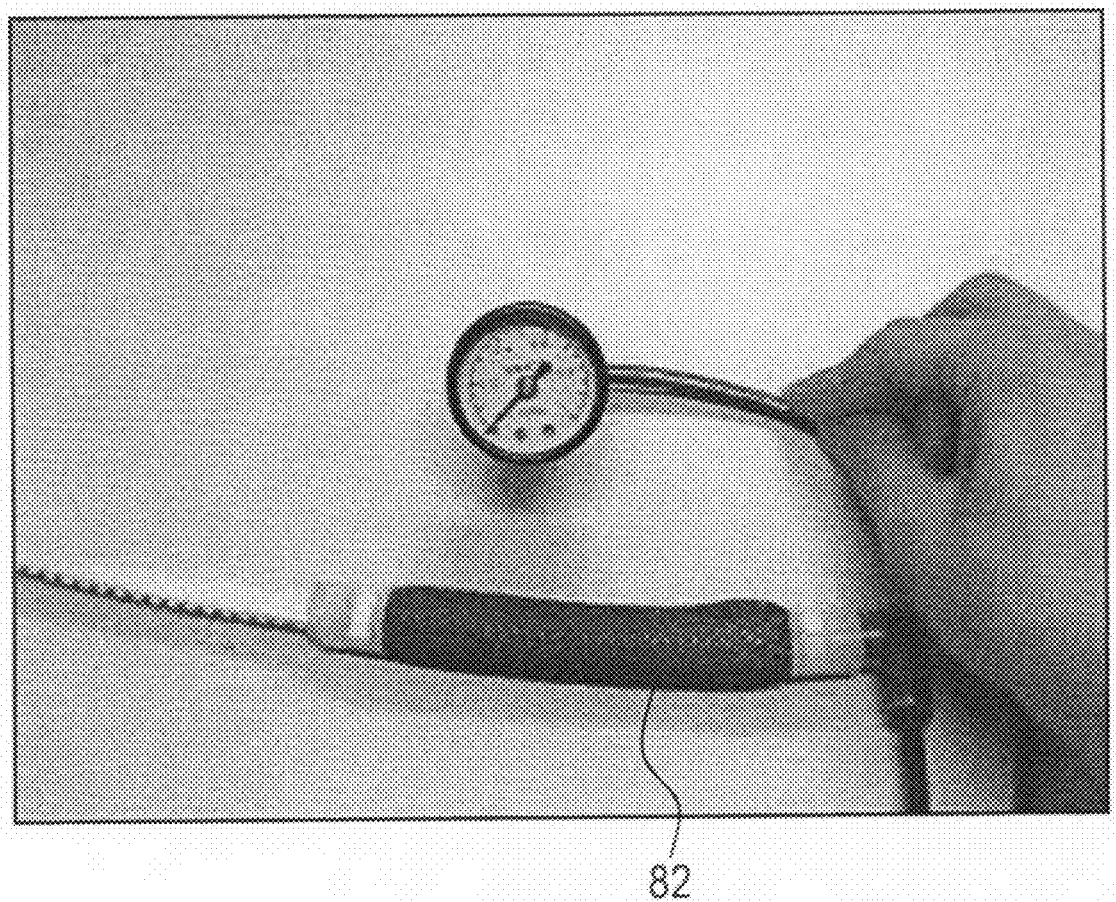
FIG. 5 is a view illustrating one example of the structure of a driving section included in the power assisting device.

The structure of the driving section 82 is not particularly limited. For example, as illustrated in FIG. 5, the driving section 82 may have a shape that models a human muscle, that is, the driving section may be an actuator (artificial muscle) that can extend and contract in a longitudinal direction. More specifically, the driving section may be made of a rubber tube and a carbon wire that covers the rubber tube. In this case, one actuator corresponds to one muscle of the living body, and the driving force of each driving section is in proportion to (i) the pressure of air put into the actuator and (ii) the cross-sectional area of the actuator. That is, in a case where the maximum pressure of air put into each actuator is the same as each other, the maximum driving force of each actuator is in proportion to the cross-sectional area of the rubber tube that is vertical to a direction in which the rubber tube expands and contracts.

When the driving section 82 generates a driving force, the driving force is applied on portions to which the driving section 82 is fixed and which are provided at the front and the back of a joint. Thus, torque is generated at the joint with the joint axis being the center. The power assisting device 8 assists and/or resists a rotational motion of the joint with use of the torque. Examples of assisting a rotational motion include a case of caring and a case of rehabilitation. Examples of resisting a rotational motion include a case of muscle training.

As illustrated in FIG. 3, the power assisting device 8 includes a driving force control section 81 that is communicably connected to a driving force calculating device 1. The driving force control section 81 controls each of the driving sections 82.

When a target muscle force value assigned to a muscle (target muscle) on which a reduced or increased load is to be applied is input to the driving force calculating device 1, the driving force calculating device 1 calculates a driving force of each of the driving sections 82 for assisting or resisting the motion. Then, the driving force control section 81 causes each of the driving sections 82 to drive in accordance with the calculated driving force. Each of the driving sections 82 generates a driving force, which is applied to portions to which the driving section 82 is fixed and which are provided at the front and the back of a joint. This generates torque at the joint with the joint axis being the center. Thus, the power assisting device 8 can assist or resist the rotational motion.

(Motion Information Acquiring Device 7)

The motion information acquiring device 7 acquires motion information based on a motion of a living body. In the present embodiment, the motion information acquiring device 7 acquires motion information based on a rotational motion at a joint of a human to be assisted by the power assisting device 8.

The motion information acquiring device 7 acquires information of a rotational motion at each instant based on an actual rotational motion of the joint. Examples of the acquired information include the angle of the joint and angular velocity and angular acceleration in the rotational motion. The motion information acquiring device 7 is not particularly limited as long as it can acquire motion information of a rotational motion of a joint. For example, the motion information acquiring device 7 may acquire images of a rotational motion with the use of a camera and extract motion information, or may detect the rotational motion with use of a sensor and extract the motion information.

Specifically, the motion information acquiring device 7 may be a so-called motion capture device or may be a device using a force plate or an accelerometer. Alternatively, the motion information acquiring device 7 may take in image data etc. that has been acquired beforehand and extract motion information from the image data. It is preferable that the motion information acquiring device 7 can acquire motion information of a plurality of joints based on an actual rotational motion at once.

As the motion information acquiring device 7, VICON (VICON 512 manufactured by Vicon Motion Systems) may be used.

The motion information acquired by the motion information acquiring device 7 is outputted to the driving force calculating device 1 and stored in a storage section 5 as motion data 56 by a control section 2. That is, the control section 2 functions as operation information acquiring means that acquires motion information.

(Structure of Driving Force Calculating Device 1)

FIG. 1 is a functional block diagram illustrating the structure of the driving force calculating device 1. As shown in FIG. 1, the driving force calculating device 1 includes a control section 2, an input section 3, an output section 4, and a storage section 5.

The input section 3 receives muscle specifying information for specifying a target muscle and a target muscle force value of the target muscle. The target muscle force value is a target value of muscle force to be generated by the target muscle when a target joint rotates under assistance (or resistance) of the power assisting device 8.

Examples of the input section 3 include an input interface such as a keyboard, a mouse, or a touch panel and an input-output interface, such as an HDD or a network connection part, which is connected to an external device.

The control section 2 includes a muscle force estimating section and a driving force determining section. The muscle force estimating section includes a joint torque calculating section 21 and an estimated muscle force calculating section 22. The driving force determining section includes a setting information acquiring section (acquiring means) 23, a target muscle force value evaluating section (target value evaluating means) 24, a target muscle force calculating section (target value calculating means) 25, a target joint torque calculating section 26, and a driving force calculating section 27.

The joint torque calculating section 21 calculates joint torque required for rotational motion for each joint. The joint torque calculated by the joint torque calculating section 21 refers to torque that rotates a joint and that is produced at a target joint without wearing of the power assisting device 8. Information on the joint torque calculated by the joint torque calculating section 21 is stored as a joint torque table 57 in the storage section 5. A method by which the joint torque calculating section 21 calculates the joint torque will be described later.

The estimated muscle force calculating section 22 calculates, in accordance with the joint torque calculated by the joint torque calculating section 21, muscle force required for each muscle to rotate the target joint without wearing of the power assisting device 8 (such muscle force being hereinafter referred to as "pre-wearing muscle force"). Information on the pre-wearing muscle force (estimated value) calculated by the estimated muscle force calculating section 22 is stored in the form of an estimated muscle force table 58 in the storage section 5. A method by which the estimated muscle force calculating section 22 calculates the pre-wearing muscle force will be described later.

The setting information acquiring section 23 acquires, via the input section 3, the muscle specifying information for specifying the target muscle whose function is assisted or resisted by the driving section 82 and the target muscle force value that is a target value of muscle force to be generated by the target muscle when the target joint rotates under assistance or resistance of the power assisting device 8. The setting information acquiring section 23 outputs the muscle specifying information and the target muscle force value to the target muscle force value evaluating section 24 such that the muscle specifying information with the target muscle force value are correlated with each other.

The target muscle force value to be inputted to the input section 3 may be a specific value of muscle force, a multiplying factor of the muscle force calculated by the estimated muscle force calculating section 22, or the like.

The target muscle force value evaluating section 24 evaluates, in accordance with the estimated muscle force table 58 and musculoskeletal model data 53 (three-dimensional structural information), the feasibility of the target muscle force of the target muscle as acquired by the setting information acquiring section 23. A method by which the target muscle force value evaluating section 24 makes such an evaluation will be described later.

The target muscle force calculating section 25 calculates, in accordance with the target muscle force value of the target muscle acquired by the setting information acquiring section 23, the pre-wearing muscle forces (estimated muscle force table 58) calculated by the estimated muscle force calculating section 22, and the musculoskeletal model data 53, a target muscle force value of a muscle other than the target muscle (hereinafter referred to as "non-target muscle") among the muscles that produce the rotational motion at the target joint. The target muscle force value of the non-target muscle is a target value of muscle force to be generated by the non-target muscle when the target joint is rotated while the power assisting device 8 worn by the user is operated.

The target joint torque calculating section 26 calculates, in accordance with (i) the target muscle force value of the target muscle, (ii) the target muscle force value of the non-target muscle as calculated by the target muscle force calculating section 25, and (iii) general model data 55, a target value (target joint torque) of joint torque to be generated at the target joint when the target joint is rotated while the power assisting device 8 worn by the user is operated. A method by which the target joint torque is calculated will be described later.

The driving force calculating section 27 calculates, in accordance with the target joint torque calculated by the target joint torque calculating section 26, the joint torque (joint torque table 57) calculated by the joint torque calculating section 21, and the general model data 55, driving force to be generated by each of the driving sections 82 and a control value for controlling each of the driving sections 82.

The output section 4 is an output interface, such as an HDD or a network connection part, which is communicably connected to the power assisting device 8. The output section 4 transmits, to the power assisting device 8, the control value calculated by the driving force calculating section 27. The output section 4 may include an output interface, such as a liquid crystal panel, which notifies the user of various types of information.

As shown in FIG. 1, the storage section 5 stores skeletal model data 51, muscle model data 52, and artificial muscle model data 54 in advance. Furthermore, the storage section 5 is capable of storing motion data 31, a joint torque table 57, an estimated muscle force table 58, and a driving force table 59.

The skeletal model data 51 includes three-dimensional structural information regarding bones of a human being. Specifically, the skeletal model data 51 includes information on the length of each bone, information on the size of each bone, information on a spatial arrangement of bones, information on the weight of each bone, information on moment of inertia of each bone, and information on the relative position of a joint axis.

In the present embodiment, the skeletal model data 51 is a link model in which multiple bones are linked via joints that rotate with fixed joint axes being centers. However, the present invention is not limited to this. The skeletal model data 51 may be a model in which a joint axis moves relative to a joint in accordance with a rotation of the joint. In this case, by adding a short virtual link to a joint portion, it is possible to reproduce a skeleton in which a joint axis moves, e.g., a skeleton of a human. The skeleton used in the skeletal model data may be that of a whole body, or may be that of a part of a body, such as an upper limb and a lower limb. Using the skeletal model data 51, it is possible to reproduce a skeleton model of a human being.

The muscle model data 52 includes three-dimensional structural information regarding muscles of a human being. Specifically, the muscle model data 52 includes information on the length of each muscle and information on the position where each muscle attaches to bones. In this manner, each muscle is modeled as a weightless wire.

The muscle model data 52 is combined with the skeletal model data 51, so that musculoskeletal model data 53 is obtained. The musculoskeletal model data 53 includes three-dimensional structural information indicative of the relative positions of a muscle and bone of a living body. The musculoskeletal model data 53 allows reproduction of a musculoskeletal model in which muscles are superimposed on the bones of a human.

The muscle model data 52 further includes information on physiological cross-sectional area of each muscle. The muscle model data 52 may further include information on the mass of each muscle and/or information on moment of inertia of each muscle etc. When the muscle model data 52 includes the information on the mass of each muscle and the information on moment of inertia of each muscle, the reproduced musculoskeletal model gets closer to actual bones and muscles.

The artificial muscle model data 54 includes three-dimensional structural information regarding the driving section 82 of the power assisting device 82. Specifically, the artificial muscle model data 54 includes information on the length of the driving section 82 and information on the position where an end of the driving section attaches to a bone when a human wears the power assisting device 8. This allows the driving section 82 to be modeled as a weightless wire.

The artificial muscle model data 54 is combined with the musculoskeletal model data 53, so that general model data 55 is obtained. The general model data 55 allows reproduction of a muscle/artificial muscle integrated model in which muscles and driving sections 82 are superimposed on the bones of a human.

The artificial muscle model data 54 further includes information on the cross-sectional area that is vertical to a direction in which the driving section 82 expands and contracts. In the present embodiment, the driving force calculating section 27 can obtain the maximum driving force from the information on the cross-sectional area. The artificial muscle model data 54 may include information on the maximum driving force instead of the information on the cross-sectional area. The artificial muscle model data 54 may further include information on the mass of each driving section 82 and/or information on moment of inertia of each driving section 82 etc.

The motion data 56 includes motion information acquired by the motion information acquiring section 7. Specifically, the motion data 56 includes information on the angle of a joint, information on the angular velocity of the joint, and information on the angular acceleration of the joint at each instant in a rotational motion. Therefore, the motion data 56 serves as a table in which the elapsed time and angle of a rotational motion, the angular velocity, and the angular acceleration are correlated.

Figure 6:
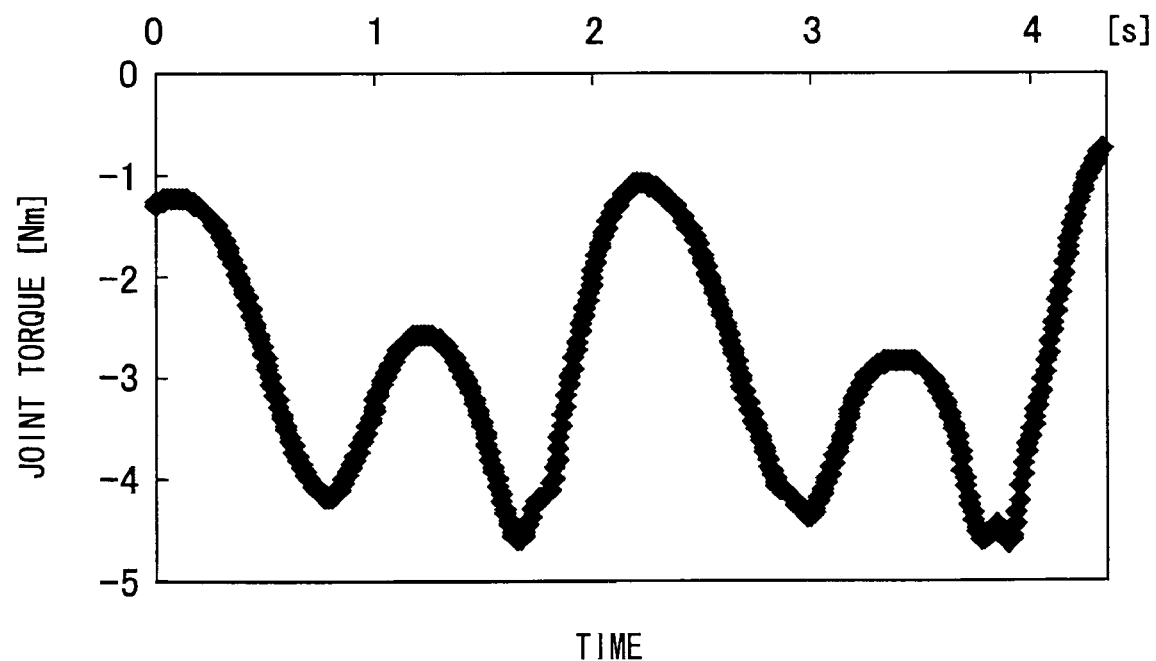
FIG. 6 is a view illustrating one example of a graph indicative of a joint torque table.

The joint torque table 57 includes information on the joint torque required for rotation of a joint, as calculated by the joint torque calculating section 21. Specifically, the joint torque table 57 includes information on joint torque needed at each instant in the rotational motion. Therefore, the joint torque table 57 serves as a table in which the elapsed time of a rotational motion and the joint torque are correlated. FIG. 6 shows an example of a graph of the joint torque table 57.

Figure 7:
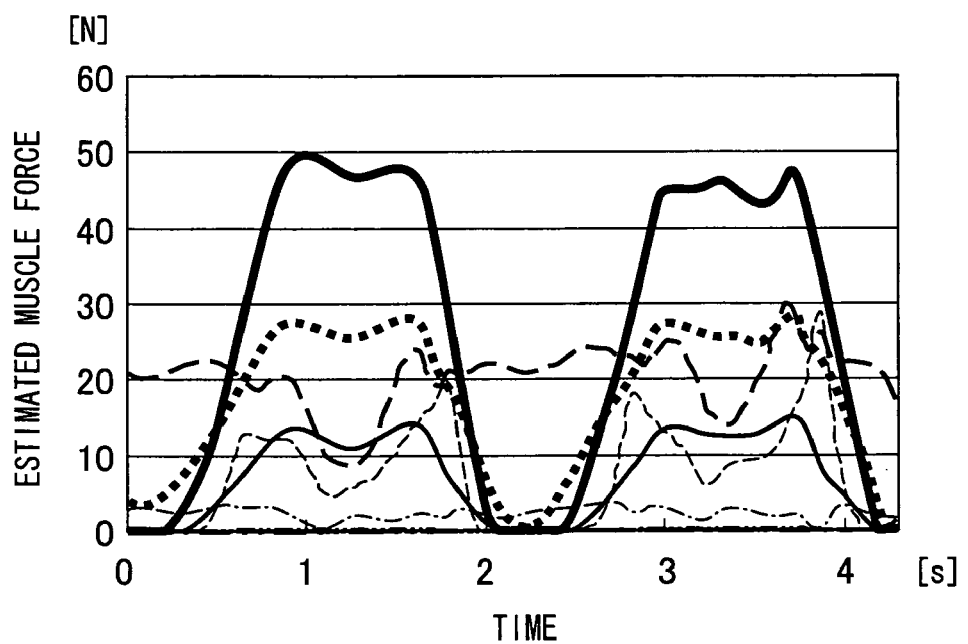
FIG. 7 is a view illustrating one example of a graph indicative of an estimated muscle force table.

The estimated muscle force table 58 includes information on the muscle force required for rotation of the target joint on which the power assisting device 8 has not been mounted, as calculated by the estimated muscle force calculating section 22. Specifically, the estimated muscle force table 58 includes information on muscle force needed at each instant in the rotational motion. Therefore, the estimated muscle force table 58 serves as a table in which the elapsed time of the rotational motion and the muscle force are correlated. FIG. 7 shows an example of a graph of the estimated muscle force table 58. FIG. 7 is a graph of an estimated muscle force table of eleven muscles necessary for an extension and flexion motion.

Figure 8:
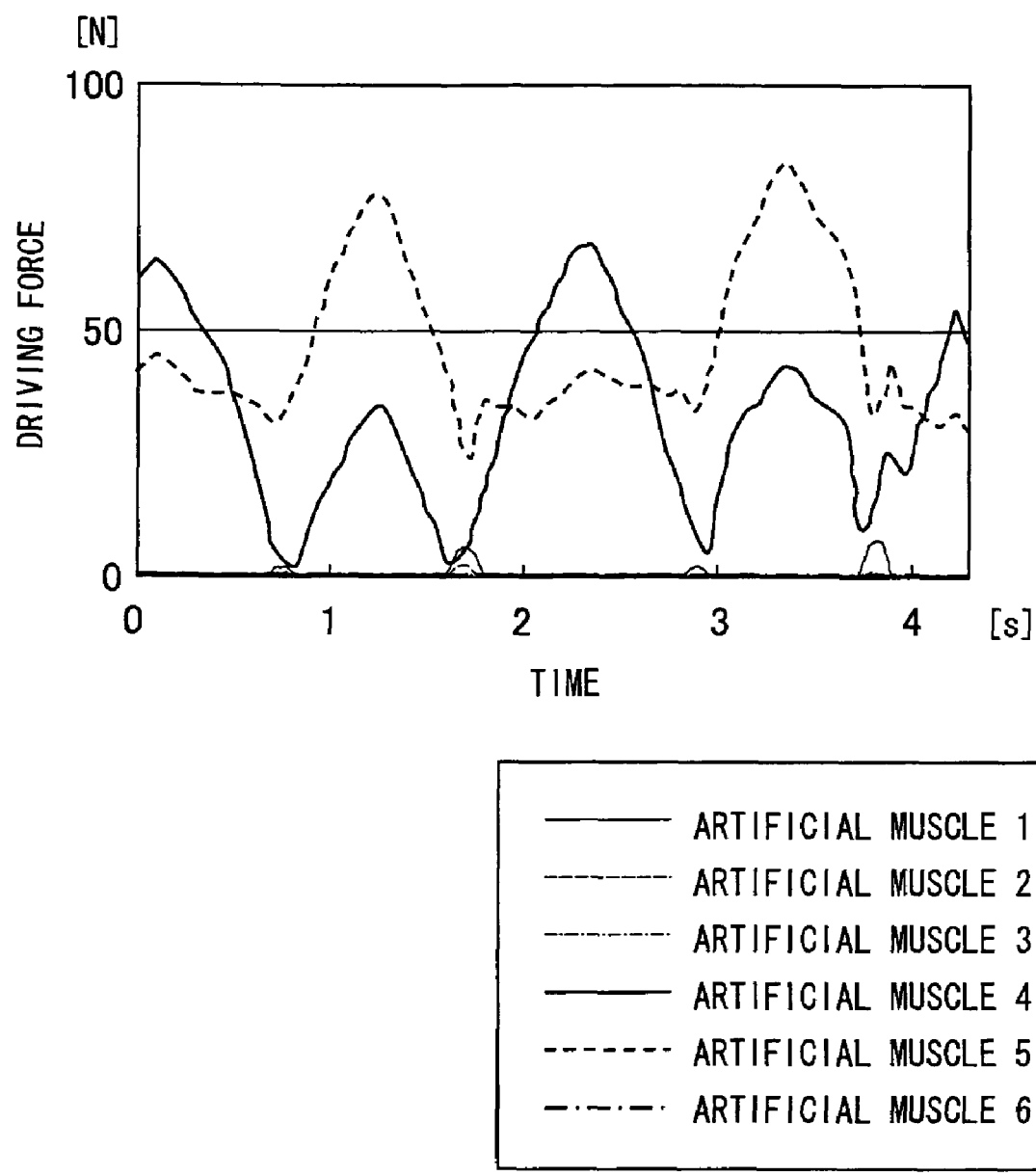
FIG. 8 is a view illustrating one example of a graph indicative of a driving force table.

The driving force table 59 includes information on the driving force of the driving section 82 of the power assisting device 8, as calculated by the driving force calculating section 27. Specifically, the driving force table 59 includes information on driving force needed at each instant in the rotational motion. Therefore, the driving force table 59 serves as a table in which the elapsed time of the rotational motion and the driving force of the driving section 82 are correlated. FIG. 8 shows an example of a graph of the driving force table 59.

(Joint Torque Calculation Method in Joint Torque Calculating Section 21)

The joint torque calculating section 21 calculates, for each joint, a joint torque necessary for a rotational motion from the angle, angular velocity, angular acceleration, and gravitational acceleration of the joint included in the motion data 56 and the mass and moment of inertia applied on a bone included in the skeletal model data 51 by dynamics calculations such as a Newton-Euler or Lagrange method The joint torque is calculated at each instant in a rotational motion. The joint torque calculated for each joint is stored in the storage section 5 as the joint torque table 57 in association with the elapsed time of the rotational motion.

(Method of Calculating Estimated Muscle Force in Estimated Muscle Force Calculating Section 22)

The estimated muscle force calculating section 22 calculates the muscle force of each muscle necessary for the rotational motion, based on the musculoskeletal model data 51 and the joint torque table 57 stored in the storage section 5. The following will describe the calculation method in detail.

Supposing that there are j muscles across arbitrary chosen joint i, torque $\tau_i$ at joint i is given by $$\tau_i = \sum_j r_j \times f_j \quad (4)$$

where $r_j$ is the moment arm of muscle j (distance from the joint axis of joint i to the attachment point of muscle j across joint i) and $f_j$ is the muscle force of muscle j. The equation implies that torque $\tau_i$ is given as a product of the muscle force of muscle j and the moment arm matrix of muscle j. Here, torque $\tau_i$ has been calculated by the joint torque calculating section 21 and stored as joint torque data in the storage section 5. Furthermore, $r_j$ can be calculated from the musculoskeletal model data 53. Accordingly, numerical values are substituted for $\tau_i$ and $r_j$ in equation (4). However, $f_j$ represents plural forces; equation (4) cannot be solved for each $f_j$.

To determine $f_j$, Crowninshield's optimization calculation, equation (1), is used in the present embodiment as mentioned earlier. The optimization calculation states that to achieve a motion, muscle forces $f_j$ are determined so that the muscle forces make the evaluation function u(f) below take a minimum value:

$$u(f) = \sum_{j=1}^{n} \left(\frac{f_j}{PCSA_j}\right)^r \to \min \quad (1)$$

where n is the number of muscles, $PCSA_j$ is the physiological cross-sectional area of muscle j. Using equation (1), the muscle forces are determined so as to minimize the sum of the r-th power of the muscle force per unit cross-sectional area of each muscle. r is any integer equal to 2 or greater.

The estimated muscle force calculating section 22 optimizes $f_j$ so that equation (1) gives a minimum value. In this case, the estimated muscle force calculating section 22 calculates muscle forces $f_j$ so that equation (1) gives a minimum value under conditions that torque $\tau_i$ stored in the joint torque table 57, moment arm $r_j$ calculated from the musculoskeletal model data 53, and muscle forces $f_j$ satisfy equation (4). In other words, the estimated muscle force calculating section 22 calculates $f_j$ so that equation (1) gives a minimum value under the constraint conditions of torque $\tau_i$ and $r_j$ in equation (4). The value of physiological cross-sectional area $PCSA_j$ necessary for the optimization calculation of $f_j$ is included in the muscle model data 52.

Another constraint condition may be added in the optimization calculation using equation (1). For example, it is known that muscle force $f_j$ that can be generated by a muscle is in the range given by inequality (5):

$$0 \leq f_j \leq kPCSA_j \quad (5)$$

where $k=0.7\times10^6$ [N/m$^2$] and $PCSA_j$ is the physiological cross-sectional area of muscle j. Therefore, it is preferable to use inequality (5) as another constraint condition. The condition excludes muscle forces that the muscles of a living body cannot actually produce.

Muscle force $f_j$ of each muscle can be calculated by using the optimization. The estimated muscle force calculating section 22 performs the calculation at each instant in the rotational motion. The muscle force of each muscle thus obtained is stored in the storage section 5 as the estimated muscle force table 58 indicative of the relation between the muscle force and the elapsed time of the rotational motion. The estimated muscle force table 58 can be represented by the graph shown in FIG. 7.

(Theorems used in Evaluation of Target Muscle Force Values)

The following will describe in detail mathematical theorems used in the evaluation of target muscle force values by the target muscle force value evaluating section 24.

The muscle force setup of the present invention is intended to allow for any change to be made to the load of each muscle. Human muscles are however interrelated. Arbitrary target muscle force settings are in many cases impossible. Therefore, target muscle force settings are preferably evaluated to find out if such a design is feasible. In the following description, the inequality constraint, $f_j \leq f_{jmax}$, is omitted to facilitate calculation.

In the present embodiment, the target muscle force value evaluating section 24 determines whether or not muscle force settings are possible, using Kuhn-Tucker conditions, or a set of optimality conditions. Applying the Kuhn-Tucker conditions to the optimize problem of equation (1), estimated muscle force f satisfies equations (6) to (8) below:

$$\nabla u(f) + \sum_{i=1}^{l} \mu_i \nabla h_i(f) + \sum_{j=1}^{m} \lambda_j + \nabla g_j(f) = 0 \quad (6)$$

$$h_i(f) = 0 \ (i = 1, 2, \ldots, 1) \ldots \quad (7)$$

$$\lambda_j g_i(f) = 0, \lambda_j \geq 0, g_j(f) \leq 0 \ (j = 1, 2, \ldots, m) \ldots \quad (8)$$

$\mu$ is Lagrange's undetermined multiplier, and $h_i$ denotes an equation constraint condition given as equation (9) which must be satisfied by the sum of muscle forces producing the torque required for a rotational motion. The torque does not change upon attaching the power assisting device 8. $\lambda$ is Lagrange's undetermined multiplier.

$$h_i = \tau - a_i^T f \quad (9)$$

where T is a joint torque necessary for the rotational motion of the joint as calculated by the joint torque calculating section 21. The joint torque must not change to carry out the same rotational motion with or without the assistance (or resistance) by the power assisting device 8.

$g_i$ is an inequality constraint condition given as equation (10):

$$g_i = -f_j \quad (10)$$

$\nabla u(f)$, $\nabla h_i(f)$, and $g_i(f)$ are the sum of partial derivatives of f for each component given in equations (11) to (13).

$$\frac{\partial u(f)}{\partial f_j} = r\left(\frac{f_j}{PCSA_j}\right)^{r-1} \overset{\Delta}{=} q_j \quad (11)$$

$$\frac{\partial h_i(f)}{\partial f_j} = a_{ij} \quad (12)$$

$$\frac{\partial g_j}{\partial f_k} = \begin{cases} -1, & j = k \\ 0, & j \neq k \end{cases} \quad (13)$$

Substituting equations (11) to (13) in equation (6) yields equation (14)

$$q = A^T \mu + \lambda \quad (14)$$

Equation (14) represents optimality conditions for muscle force estimation. In equation (14), λ is Lagrange's undetermined multiplier, A is a moment arm matrix, and T is a joint torque necessary for a rotational motion of a joint. q, μ, and λ are given by equations (15) to (17):

$$q = [q_1, q_2, \ldots, q_m]^T \quad (15)$$

$$\mu = [\mu_1, \mu_2, \ldots, \mu_l]^T \quad (16)$$

$$\lambda = [\lambda_1, \lambda_2, \ldots, \lambda_m]^T \quad (17)$$

where m is the number of muscles involved in the rotational motion, and l is the number of target muscles.

Equation (8) shows that if the j-th muscle force $f_j$ is greater than 0, the corresponding $\lambda_j$ is always 0. Classifying muscle forces $f_j$ contained in muscle force f by whether o not they are 0, equation (14) is rewritten as equation (18):

$$\begin{bmatrix} \tilde{q} \\ 0 \end{bmatrix} = \begin{bmatrix} \tilde{A}_u \\ \tilde{A}_v \end{bmatrix} \mu + \begin{bmatrix} 0 \\ \tilde{\lambda} \end{bmatrix} \quad (18)$$

where the components q (with a tilde) and λ (with a tilde) are all positive, $A_u$ (with a tilde) is a k×1 dimensional moment arm matrix, and $A_v$ (with a tilde) is a (m−k)×1 dimensional moment arm matrix. m is the number of muscles involved in the rotational motion, k is the number of muscles of which the muscle force is not 0 during the rotational motion, and l is the number of target muscles.

In addition, $A_u$ (with a tilde) and $A_v$ (with a tilde) are the variables in $A_u$ and $A_v$ rearranged in the order of variables for the target muscles, those for non-target muscles, and those for inactive muscles.

An ordinary muscle force $f_0$ satisfies equations (19) and (20):

$$\tau_0 = A f_0 \quad (19)$$

$$q_0 = A^T \mu_0 + \lambda_0 \quad (20)$$

Here, q and f are related by equations (21) and (22):

$$q_j = w(f_i) = r \left( \frac{f_j}{PCSA_j} \right)^{r-1} \quad (j = 1, \ldots, m) \quad (21)$$

$$f_j = w^{-1}(q_0) = PCSA_j \left( \frac{q_j}{r} \right)^{\frac{1}{r-1}} \quad (j = 1, \ldots, m) \quad (22)$$

where w is function converting f to q, and r is any integer equal to or greater than 2.

Rewriting $\mu_0$ and $\lambda_0$ in equation (20) as in equation (18), we can obtain equation (23) for $\mu_0$ and $\lambda_0$.

$$\begin{bmatrix} \tilde{q}_0 \\ 0 \end{bmatrix} = \begin{bmatrix} \tilde{A}_u \\ \tilde{A}_v \end{bmatrix} \mu_0 + \begin{bmatrix} 0 \\ \tilde{\lambda}_0 \end{bmatrix} \quad (23)$$

The target muscle forces $f_d$ similarly satisfy equation (24):

$$\begin{bmatrix} \tilde{q}_d \\ 0 \end{bmatrix} = \begin{bmatrix} \tilde{A}_u \\ \tilde{A}_v \end{bmatrix} \mu_d + \begin{bmatrix} 0 \\ \tilde{\lambda}_d \end{bmatrix} \quad (24)$$

Here, $q_d$ contains $q_{dj}$ (j=1, 2, . . . , k) calculated from the target muscle forces $f_{di}$ using equation (21).

$q_d$ obtained using equation (26) from α that satisfies equation (25) is feasible from equations (23) and (24). Furthermore, feasible muscle force $f_d$ can be calculated from equation (21).

$$\lambda_0 - \tilde{A}_v \alpha > 0 \quad (25)$$

$$\tilde{q}_d = \tilde{q}_0 + \tilde{A}_u \alpha \quad (26)$$

(Proof)

It will be proved that if α satisfies equation (25), $\mu_d$ and $\lambda_d$ (with a tilde) exist in $q_d$ ($f_d$) obtained from equation (26).

$\mu_d$ and $\lambda_d$ (with a tilde) are given by equations (27) and (28) respectively:

$$\mu_d = \mu_0 + \alpha \quad (27)$$

$$\tilde{\lambda}_d = \tilde{\lambda}_0 - \tilde{A}_v \alpha \quad (28)$$

From equations (23) and (26), equation (29) is derived:

$$\begin{bmatrix} \tilde{q}_d \\ 0 \end{bmatrix} = \begin{bmatrix} \tilde{q}_0 + \tilde{A}_v \alpha \\ 0 \end{bmatrix} \quad (29)$$

$$= \begin{bmatrix} \tilde{A}_u \\ \tilde{A}_v \end{bmatrix} \mu_0 + \begin{bmatrix} 0 \\ \tilde{\lambda}_0 \end{bmatrix} + \begin{bmatrix} \tilde{A}_u \\ \tilde{A}_v \end{bmatrix} \alpha + \begin{bmatrix} 0 \\ -\tilde{A}_v \alpha \end{bmatrix}$$

$$= \begin{bmatrix} \tilde{A}_u \\ \tilde{A}_v \end{bmatrix} \mu_d + \begin{bmatrix} 0 \\ \tilde{\lambda}_d \end{bmatrix}$$

In addition, in order to make target muscle forces feasible, they need satisfy equation (25) and two more conditions. A first condition is that the target muscle forces $f_{dj}$ are all positive. A second condition is that α has a solution for a target muscle force $f_{d1}$ AND that equations (30) and (31) are satisfied supposing that the moment arm matrix corresponding to the target muscle forces $f_{d1}$ is $A_{u1}$. In other words, $A_{u1}$ is the distance between the center of the joint on which the target muscle exerts force and the part of the bone to which the target muscle is attached.

$$\Delta q_{d1} = q_{d1} - q_{01} = A_{u1} \alpha \quad (30)$$

$$\Delta q_{d2} = q_{d2} - q_{02} = A_{u2} \alpha \quad (31)$$

where $q_{d2}$, $q_{02}$, and $A_{u2}$ are values related to a non-target muscle (in other words, $A_{u2}$ is distance between the center of the joint on which a non-target muscle exerts force and the part of bone to which the non-target muscle is attached). α is a free parameter.

Equation (32) below needs to be satisfied so that α has a solution.

$$\text{rank}(A_{u1}) = \text{rank}([A_{u1} \Delta q_{d1}]) \quad (32)$$

Equation (32) is related to the number of linearly independent vectors composing the matrix.

(Target Muscle Force Value Evaluating Method in Target Muscle Force Value Evaluating Section 24)

The following details processes carried out in the target muscle force value evaluating section 24. In the following description, a target muscle force of the target muscle in a rotational motion is expressed as $f_{d1}$ or $q_{d1}$, and an estimated muscle force (pre-wearing muscle force) of the target muscle without wearing the power assisting device 8 is expressed as $f_{o1}$ or $q_{o1}$.

The target muscle force value evaluating section 24, first, calculates $\Delta q_{d1}$ (i.e., a difference between the target muscle force of the target muscle and its muscle force before wearing the power assisting device 8) from the equation (30).

Further, the target muscle force value evaluating section 24 determines 1) whether $\Delta q_{d1}$ satisfies the equation (32) or not (first condition), 2) whether the free parameter $\alpha$ satisfies the equation (25) or not (second condition), 3) whether the vector $q_d$ calculated from the equation (26) is positive or not (third condition), and whether all elements of the vector $f_d$ obtained by the equation (22) are positive or not (fourth condition).

If $\Delta q_{d1}$ satisfies the equation (32) (satisfies the first condition), this means that at least one free parameter $\alpha$ exists.

If a target muscle force of the non-target muscle in a rotational motion is expressed as $f_{d2}$ or $q_{d2}$, and an estimated muscle force (pre-wearing muscle force) of the non-target muscle without wearing the power assisting device 8 is expressed as $f_{o2}$ or $q_{o2}$, a relation between $f_{o2}$ or $q_{o2}$ and the free parameter $\alpha$ is expressed by the equation (31).

The equation (31) shows that the target muscle force value of the non-target muscle is determined by determining the free parameter $\alpha$. However, it is general that there are many free parameters $\alpha$ each of which satisfies the equation (32) (satisfies the first condition). For example, in case of actively controlling four muscles with respect to four degrees of freedom (four joints), the free parameter $\alpha$ is uniquely determined, but in case of controlling three or less muscles, the free parameter $\alpha$ is not uniquely determined, so that a degree of freedom remains.

Further, the free parameter $\alpha$ has to satisfy the equation (25) (second condition). The equation (25) shows that a target muscle force value of a muscle whose muscle force is zero in a rotational motion without wearing the power assisting device 8 is zero.

Furthermore, it is necessary that the vector $q_d$ calculated from the expression (26) is positive (third condition) and all elements of the vector $f_d$ obtained by the equation (22) are positive (fourth condition). These conditions are set in consideration of such a muscular property that it is possible only to contract.

As described above, the target muscle force value evaluating section 24 determines whether the target muscle force value of the target muscle which has been acquired by the setting information acquiring section 23 satisfies the first to fourth conditions or not, and the first condition is that there is at least one free parameter $\alpha$ corresponding to the target muscle force value, and the second condition is that a muscle whose muscle force generated in a rotational motion is zero has a target muscle force value of 0, and the third and fourth conditions are set in consideration of such a muscular property that it is possible only to contract (such a muscular property that a force can be exerted only in a single direction, i.e., in a contracting direction).

It may be so arranged that: the target muscle force value evaluating section 24 informs, via the output section 4, the user that the target muscle force value is inappropriate, when it is determined that the target muscle force value of the target muscle which has been acquired by the setting information acquiring section 23 does not satisfy the first condition (that is, when it is determined that there is no free parameter $\alpha$).

That is, it may be so arranged that: the target muscle force value evaluating section 24 determines whether or not there is at least one free parameter $\alpha$ corresponding to the target muscle force value, and in case where there is no free parameter $\alpha$, it is determined that the target muscle force value is unfeasible.

Note that, the target muscle force value evaluating section 24 acquires musculoskeletal model data 53 and an estimated muscle force table 58 so as to carry out the calculation.

(Target Muscle Force Calculating Method in Target Muscle Force Calculating Section 25)

The following details processes carried out in the target muscle force calculating section 25. The following equation (33) expresses all forms of the free parameters $\alpha$ for realizing the muscle control of the target muscle. The equation (33) is derived from the equation (30).

$$\alpha = A_{\tilde{u}1}^+ \Delta q_{\tilde{d}1} + (1 - A_{\tilde{u}1}^+ A_{\tilde{u}1})k \tag{33}$$

In the equation (33), I is an identity matrix and a free parameter k shows a remaining degree of freedom. If the free parameter k is changed, also the free parameter $\alpha$ changes, but the free parameter $\alpha$ calculated by the equation (33) satisfies the equation (30) (that is, the target muscle force may be realized) regardless of the value of the free parameter k.

If $\alpha$ of the equation (31) is substituted by the equation (33), the following equation (34) can be obtained.

$$\begin{aligned} \tilde{q_{d2}} - \tilde{q_{02}} &= \Delta \tilde{q_{d2}} \\ &= \tilde{A_{u2}}\alpha \\ &= \tilde{A_{u2}}\{A_{u1}^{-+}\Delta \tilde{q_{d1}} + (I - A_{u1}^{-+}A_{u1}^{-})k\} \\ &= \tilde{A_{u2}}A_{u1}^{-+}\Delta \tilde{q_{d1}} + \tilde{A_{u2}}(I - A_{u1}^{-+}A_{u1}^{-})k \\ &= Y - Dk \end{aligned} \tag{34}$$

where Y and D are values respectively expressed by the following equations (35) and (36)

$$Y = \tilde{A}_{u2}\tilde{A}_{u1}^+ \Delta \tilde{q}_{d1} \tag{35}$$

$$D = \tilde{A}_{u2}(I - \tilde{A}_{u1}^+ \tilde{A}_{u1}) \tag{36}$$

A difference between an estimated muscle force of the non-target muscle before wearing the power assisting device 8 and a target muscle force of the non-target muscle after wearing the power assisting device 8 which difference is expressed by the following equation (37) is determined by the free parameter k.

$$\Delta f_{d2} = w^{-1}(\Delta q_{d2}) \tag{37}$$

It is possible to use all the free parameters k each of which satisfies the first to fourth conditions, so that the free parameter k cannot be determined in a single manner. However, in the present embodiment, the most appropriate manner is to calculate only one solution which causes the muscle force of the non-target muscle to hardly change before and after wearing the power assisting device 8. This manner allows the change in a muscle force of a muscle other than the target muscle to be minimized. An optimization calculation equation for calculating the solution is expressed as the following equation (38).

$$\|\Delta \tilde{q}_{d2}\|^2 = \|Y - Dk\|^2 \to \min \tag{38}$$

Constraint conditions in using the equation (38) are: a condition under which the equation (25) is satisfied; and a condition under which all the muscle forces calculated by the equation (26) are positive (the third condition and the fourth condition). In this manner, the free parameter $\alpha$ is uniquely determined.

After calculating the one solution, $q_{d2}$ (tilde) is calculated from the equation (34). The target muscle force value can be expressed by the following equation (39).

$$f_d = \begin{bmatrix} \tilde{f}_{d1} \\ \tilde{f}_{d2} \\ 0 \end{bmatrix} = w^{-1}\left(\begin{bmatrix} \tilde{q}_{d1} \\ \tilde{q}_{d2} \\ 0 \end{bmatrix}\right) \quad (39)$$

As described above, the target muscle force calculating section 25 determines the free parameter α uniquely from the target muscle force value of the target muscle which has been acquired by the setting information acquiring section 23 in accordance with the equation (33), and calculates the target muscle force value of the non-target muscle by using the equation (34) and the equation (38) in accordance with the free parameter α. Note that, in order to carry out the calculation, the target muscle force calculating section 25 acquires the musculoskeletal model data 53 and the estimated muscle force table 58 from the storage section 5.

In other words, if the target muscle force value evaluating section 24 determines that the target value is feasible, the target muscle force calculating section 25 calculates, in accordance with (i) a target value of a muscle force to be generated by the target muscle, (ii) the estimated muscle force table 58, and (iii) the musculoskeletal model data 53, a target value of a muscle force generated in a motion of the non-target muscle under assistance or resistance of the power assisting device 8 out of muscles involved in a skeletal motion at the target joint.

(Target Joint Torque Calculating Method in Target Joint Torque Calculating Section 26)

The target joint torque calculating section 26 calculates $f_d$ by substituting values of the equation (39) by the target muscle force values ($f_{d1}$ and $f_{d2}$) calculated by the target muscle force calculating section 25, and calculates a target joint torque $\tau_d$ by substituting a value of the equation (40) by $f_d$.

$$\tau_d = A f_d \quad (40)$$

(Driving Force Calculating Method in Driving Force Calculating Section 27)

A joint torque $\tau_a$ generated by the driving section 82 corresponds to a difference between a joint torque in the target joint before wearing the power assisting device 8 and a joint torque in the target joint after wearing the power assisting device 8. That is, the joint torque $\tau_a$ is expressed by the following equation (41).

$$\tau_a = \tau_0 - \tau_d \quad (41)$$

The driving section 82 is made of pneumatic rubber artificial muscle. Thus, the driving section 82 has redundancy as in the human muscle. In order to calculate an output of each driving section 82, the driving force calculating section 27 generates an evaluation function as in estimation of the human muscle force, and carries out minimization calculation of the evaluation function.

In the present embodiment, an evaluation function expressed by the following equation (42) is used.

$$u_a = \sum_{k=1}^{l} p_k^r \to \min \quad (42)$$

That is, the driving force calculating section 27 calculates the driving force of each driving section 82 so that a sum of the driving forces of the driving sections 82 is minimum. In the equation (42), $p_k$ is a driving force of a k-th driving section 82.

l is the number of the driving sections 82. The constraint conditions of the equation (42) are expressed as the following equations (43) and (44).

$$\tau_a = A_a P \quad (43)$$

$$0 \leq p_k \leq f_{maxk} \quad (44)$$

where $A_a$ is a moment arm matrix of the driving sections 82 and $f_{maxk}$ of each driving section 82 is a maximum output.

The driving force calculating section 27 calculates a driving force p which causes the equation (42) to have a minimum value for each driving section 82. Note that, in order to carry out the calculation, the driving force calculating section 27 acquires general model data and the joint torque table 57 from the storage section 5.

(Flow of Processes in Driving Force Calculating Device 1)

Figure 9:
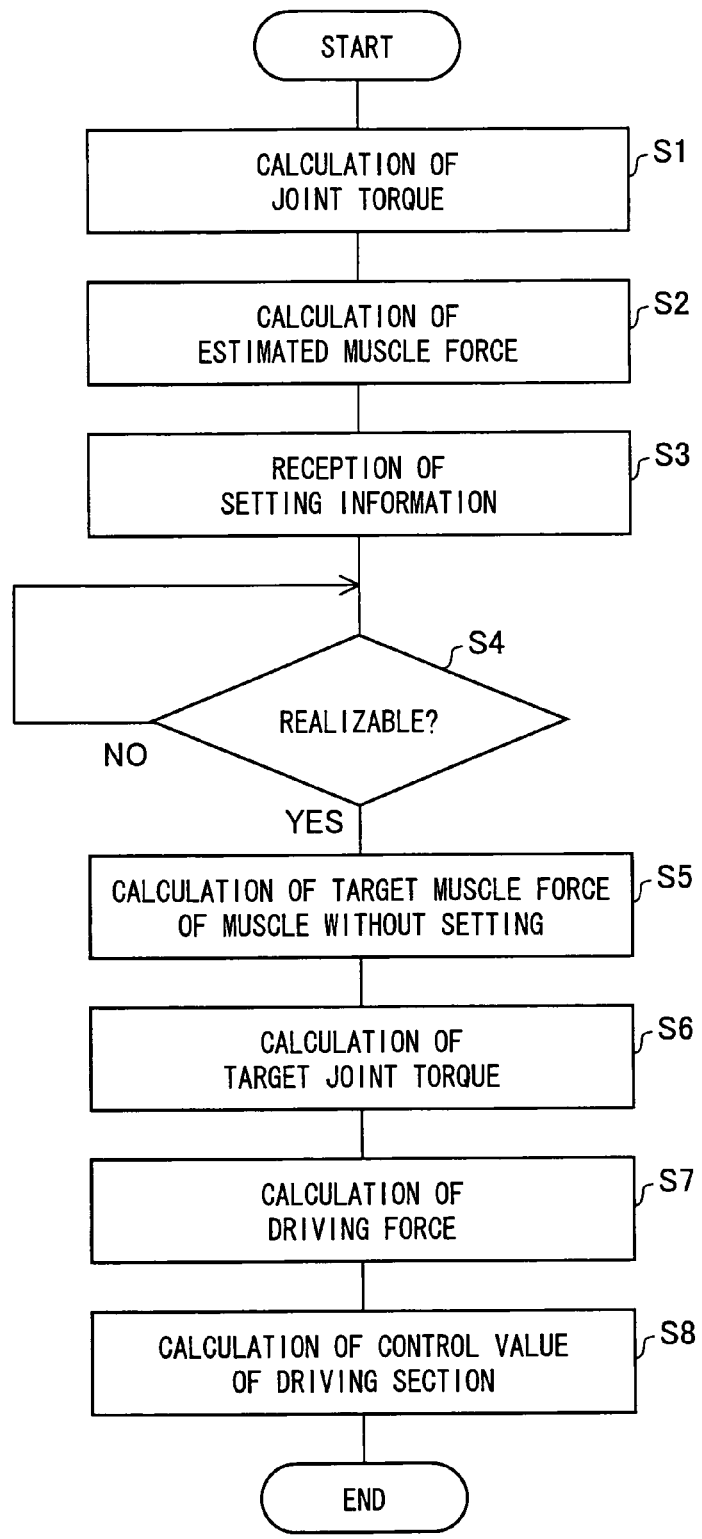
FIG. 9 is a flowchart illustrating one example of a process flow in the driving force calculating device.

Now, the following will describe an example of the flow of processes in the driving force calculating device 1, with reference to FIG. 9. FIG. 9 is a flowchart showing an example of the flow of processes in the driving force calculating device 1.

It is presupposed that the motion data 56 has already been acquired by the motion information acquiring device 7 and stored in the storage section 5.

First, as discussed above, the joint torque calculating section 21 calculates, for each joint, the joint torque required for a rotational motion, based on the motion data 56 stored in the storage section 5 (S1). The joint torque calculating section 21 stores, as a joint torque table 57, the joint torque calculated for each joint in the storage section 5. In the storage section 5, each joint torque is associated with an elapsed time of the rotational motion.

Subsequently, the estimated muscle force calculating section 22 calculates the muscle force (pre-wearing muscle force) which is required for a rotational motion when the user does not wear the power assisting device 8 (S2). More specifically, the estimated muscle force calculating section 22 calculates, as discussed above, the muscle forces of muscles required for the rotational motion, based on the musculoskeletal model data 51 and the joint torque table 57 which are stored in the storage section 5. The calculation of the muscle force is carried out at each instant in the rotational motion. The acquired value of the pre-wear muscle force is associated with a moment of the rotation motion and is stored, as the estimated muscle force table 58, in the storage section 5.

Thereafter, when the user inputs, through the input section 3, (i) muscle specifying information that specifies a muscle (target muscle) to which a muscle force is to be assigned and (ii) a target muscle force value which is a target value of the muscle force assigned to the specified muscle, the setting information acquiring section 23 receives these sets of information (S3) and the sets of information are then output to the target muscle force value evaluating section 24.

In inputting a target muscle force value, the user may input a target muscle force in an arbitrary waveform. Alternatively, a target muscle force value may be set by using a multiplying factor of a muscle force stored in the estimated muscle force table 58. In the latter case, the muscle force is set by using a desired multiplying factor of a muscle force which is required for some motion. The user can therefore easily perform the setting of the power assisting device 8.

In case where the muscle force is assigned by using a multiplying factor, the input section 3 receives (i) information for specifying a muscle to which the muscle force is assigned and (ii) a multiplying factor of the muscle force which is to be assigned to the muscle. The setting information acquiring section 23 extracts the muscle force data of the muscle which is a target muscle, with reference to the estimated muscle force table 58, and multiplies the extracted muscle force data by the multiplying factor thus inputted. The muscle force data after the multiplication is stored in the storage section 5, as a muscle force setting table (not illustrated) which corresponds to an elapsed time of the rotational motion.

Receiving the muscle specifying information and the target muscle force value, the target muscle force value evaluating section 24 evaluates, as discussed above, whether the target muscle force indicated by the target muscle force value is feasible by the target muscle indicated by the muscle specifying information. More specifically, the target muscle force value evaluating section 24 determines whether the target muscle force of the target muscle satisfies all of the aforesaid first to fourth conditions.

In case where the target muscle force of the target muscle does not satisfy at least one of the first to fourth conditions (NO in S4), the target muscle force value evaluating section 24 notifies, via the output section 4, the user that the target muscle force value thus input is inappropriate.

As discussed above, the target muscle force value evaluating section 24 may first determines whether the target muscle force of the target muscle satisfies the first condition. In this case, if the target muscle force does not satisfy the first condition, it is notified to the user.

If the target muscle force of the target muscle satisfies all of the first to fourth conditions (YES in S4), the target muscle force value evaluating section 24 outputs, to the target muscle force calculating section 25, (i) an instruction to calculate a target muscle force of a muscle (non-target muscle) at a target joint but is not a target muscle, (ii) the muscle specifying information, and (iii) the target muscle force value.

Receiving the instruction, the target muscle force calculating section 25 calculates, as discussed above, the target muscle force of the non-target muscle, with reference to the target muscle force value $f_{d1}$ of the target muscle (S5). For example, the target muscle force of the non-target muscle is calculated by figuring out a solution of the above-mentioned value k in such a way as to keep the muscle force of the non-target muscle to be unchanged as much as possible. The target muscle force calculating section 25 outputs, to the target joint torque calculating section 26, the target muscle force value of the non-target muscle and the target muscle force value of the target muscle, which have been calculated.

Receiving these target muscle force values, the target joint torque calculating section 26 calculates, using the above-mentioned equation (40) and from the supplied target muscle force values, the target joint torque at the target joint in case where the target muscle force is achieved (S6). After calculating the target joint torque, the target joint torque calculating section 26 outputs the value of the target joint torque to the driving force calculating section 27.

Receiving the value of the target joint torque, the driving force calculating section 27 calculates, as discussed above, the driving force to be generated by the driving section 82 (S7), and calculates a control value for causing the driving section 82 to generate the driving force (S8). The driving force calculating section 27 sends the calculated control value to the driving force control section 81 of the power assisting device 8, via the output section 4.

It is noted that the process in the step S8 may be carried out by the driving force control section 81 of the power assisting device 8.

(Result of Implementation)

Figure 10:
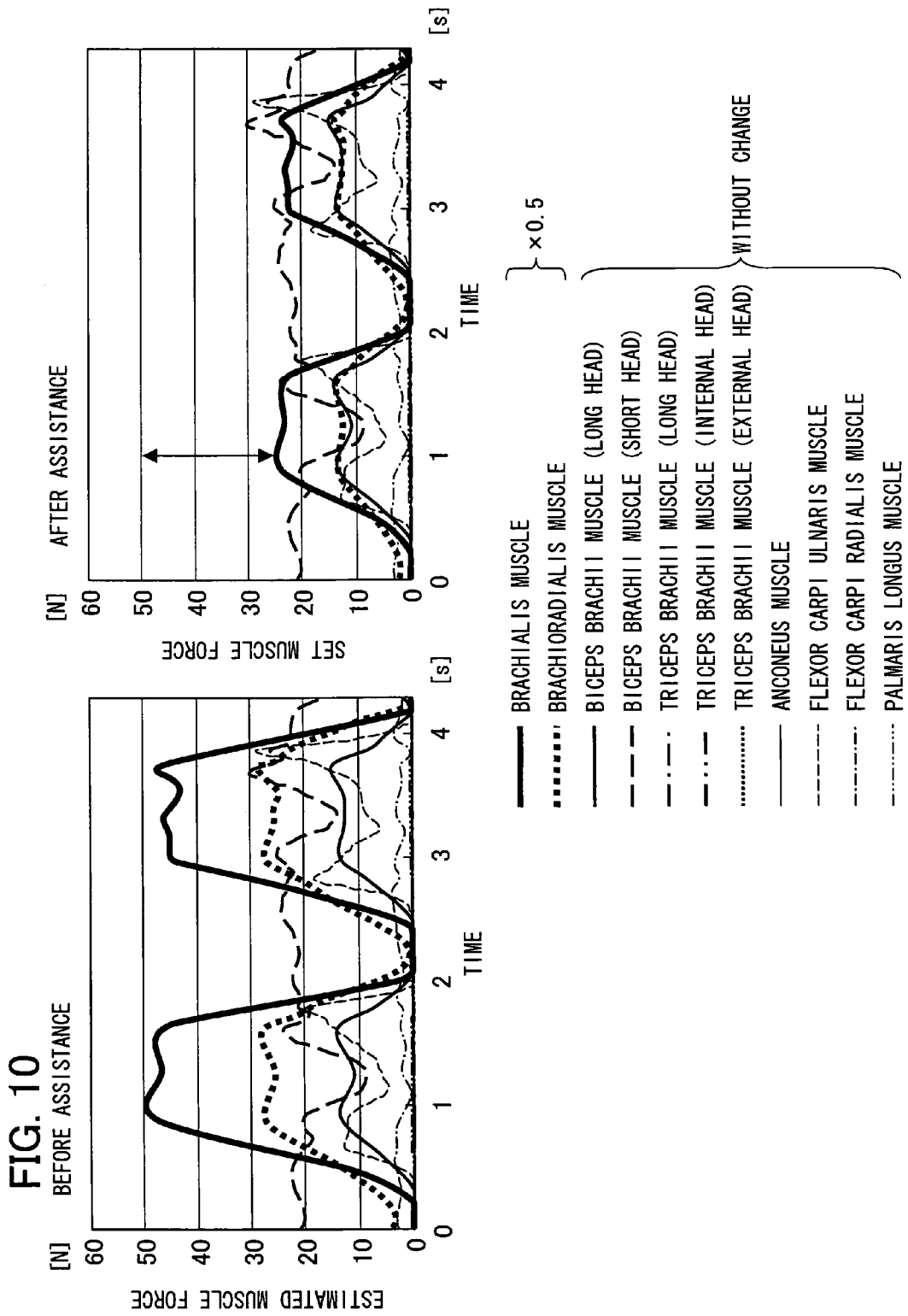
FIG. 10 is a graph indicative of results of implementations of the conventional invention.

The result of implementation in case where the rotational motion of the user's arm is assisted by the power assisting system 10 will be explained, referring to a comparison with the result of implementation of the prior invention. FIG. 10 is a graph showing the result of implementation of the conventional invention. The result of implementation shown in the figure is similar to the result recited in International Publication 2006/092872 pamphlet. This result shown in the figure is acquired on the condition that the muscle forces of the brachialis muscle and the brachioradialis muscle after assisted by the power assisting device are arranged to be half as much as the muscle forces before assisted, whereas the muscle forces of the other muscles after assisted are identical with the muscle forces before assisted.

As shown in FIG. 10, the muscle forces of the brachialis muscle and the brachioradialis muscle after the assist by the power assisting device are larger than the half of the muscle forces before the assist. Therefore the conventional invention fails to completely achieve the target muscle force.

Figure 11:
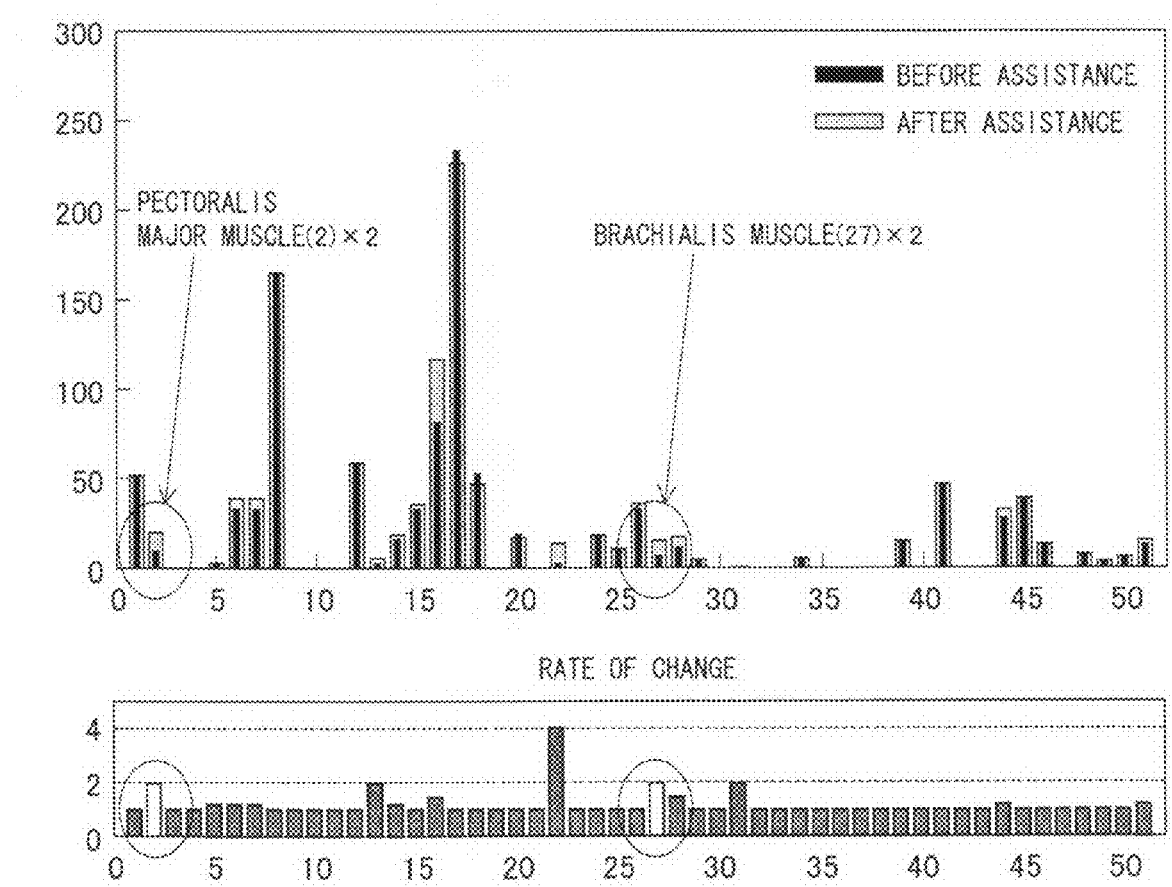
FIG. 11 is a graph indicative of results of implementations of a power assisting system 10.

FIG. 11 indicates graphs showing a result of implementation in case where the power assisting system 10 is used, and shows the result of implementation on the condition that target muscle force values are input in such a way as to double the muscle forces of the pectoralis major muscle and the brachialis muscle. The horizontal axis of the graph indicates the serial numbers assigned to the muscles, respectively. The serial numbers are shown in FIG. 12, along with the physiological cross-sectional areas of the respective muscles. The vertical axis of the graph indicates muscle forces (in units of N).

The upper graph indicates the muscle forces (estimated muscle forces) of the respective muscles before and after the resisting by the power assisting device 8. The lower graph shows rates of change, which are calculated by dividing, by the muscle forces before the resisting, the muscle forces after the resisting by the power assisting device 8.

The muscle force of the pectoralis major muscle (serial number 2) is about 10N before the resisting, and is doubled (to about 20N) after the resisting by the power assisting device 8. The lower graph shows that the rate of change is precisely 200%.

The muscle force of the brachialis muscle (serial number 27) is similarly doubled. In this manner, it is confirmed that the power assisting system 10 makes it possible to precisely achieve a desired multiple of the load on the target muscle.

The muscle forces of the non-target muscles may be varied due to influences of the assisting or resisting to the target muscle. However, since the power assisting system 10 is arranged so as to keep the muscle forces of the non-target muscles to be unchanged as much as possible, the changes in the muscle forces of the non-target muscle are restrained at a low level overall.

(Variant Example)

In the scheme above, the target muscle force calculating section 25 calculates the target muscle force values of the non-target muscles in such a way as to keep the muscle forces of the non-target muscles to be unchanged as much as possible. Alternatively, the following scheme may be adopted: the user further specifies non-target muscles (referred to as "specified non-target muscles") whose muscle forces are to be unchanged, and the target muscle force calculating section 25 calculates the target muscle force values of the other non-target muscles in such a way as not to change the muscle forces of those specified non-target muscles.

In this scheme, the number of the specified non-target muscles are determined in such a manner that the sum total of the number of the target muscles and the number of the specified non-target muscles is identical with the number of the joints controllable by the power assisting device 8.

Then the target muscle force values $q_{d1}$ of the specified non-target muscles are determined so that the target muscle forces value $q_{d1}$ are identical with the muscle forces stored in the estimated muscle force table 58.

The target muscle force calculating section 25 uses the following equation (45) in place of the above-mentioned equation (33).

$$\alpha = A_{u1}^{-1} \Delta q_{d1} \quad (45)$$

Since the free parameter $\alpha$ and $\Delta q_{d1}$ are in the same dimension, a typical inverse matrix can be figured out, and hence the solution of $\alpha$ is uniquely determined.

The driving force calculating device 1 may be integrated with the power assisting device 8. The muscle force estimating section (joint torque calculating section 21 and estimated muscle force calculating section 22) and the driving force calculating section (setting information acquiring section 23, target muscle force value evaluating section 24, target muscle force calculating section 25, target joint torque calculating section 26, and driving force calculating section 27) of the driving force calculating device 1 may be arranged as independent devices, respectively.

The present invention is not limited to the description of the embodiments above, but may be altered by a skilled person within the scope of the claims. An embodiment based on a proper combination of technical means disclosed in different embodiments is encompassed in the technical scope of the present invention.

The blocks in the driving force calculating device 1 may be realized by hardware logic. Alternatively, the blocks may be realized by software, with the use of a CPU as follows.

That is, the driving force calculating device 1 may include members such as: a CPU (Central Processing Unit) that executes instructions of a control program realizing the functions; a ROM (Read Only Memory) recording the program; a RAM (Random Access Memory) on which the program is executed; and a storage device (recording medium) such as a memory, which stores the program and various kinds of data. The objective of the present invention can be achieved in the following manner: program code (e.g. an executable code program, intermediate code program, and source program) of the control program of the driving force calculating device 1, the control program being software for realizing the functions, is recorded on a recording medium in a computer-readable manner, this recording medium is supplied to the driving force calculating device 1, and the computer (or CPU or MPU) reads out the program code from the recording medium and execute the program.

Examples of such a recording medium include a tape, such as a magnetic tape and a cassette tape; a magnetic disk, such as a flexible disk and a hard disk; a disc including an optical disc, such as a CD-ROM/MO/MD/DVD/CD-R; a card, such as an IC card (inclusive of a memory card); and a semiconductor memory, such as a mask ROM, an EPROM (Erasable Programmable Read Only Memory), an EEPROM (Electrically Erasable Programmable Read Only Memory), or a flash ROM.

Alternatively, the driving force calculating device 1 may be capable of being connected to a communications network, allowing the program code to be supplied via the communications network. Non-limiting examples of the communications network include the Internet, intranet, extranet, LAN, ISDN, VAN CATV network, virtual private network, telephone network, mobile communications network, and satellite communications network. Non-limiting examples of the transmission media composing the communications network are, wired media such as IEEE1394, USB, power line communication, cable TV lines, telephone lines, and ADSL lines, infrared light such as IrDA and remote controller, electric waves such as Bluetooth®, IEEE802.11, HDR, mobile telephone network, satellite connection, and terrestrial digital broadcasting network. It is also noted the present invention may be realized as a computer data signal embedded in a carrier wave, which is realized by electronic transmission of the program code.

The present invention makes it possible to calculate a setting value for a power assisting device which applies a desired load on a particular muscle or supports a particular muscle. Thus, effective muscle training and effective rehabilitation can be achieved. Further, a user can perform some rehabilitation exercises at home. In this manner, the present invention is highly applicable to the field of sports and medical services.

As described above, it is preferable that the target value evaluating means of the driving force calculating device determines whether the target value satisfies at least the following equation (i):

$$\text{rank}(A_{u1}) = \text{rank}([A_{u1} \Delta q_{d1}]) \quad (1)$$

where $\Delta q_{d1}$ is difference between the target value and muscle force required for rotation of the joint without wearing of the power assisting device, and $A_{u1}$ is distance between a center of the joint on which the target muscle exerts force and a part of the bone to which the target muscle is attached.

With the above arrangement, the target value evaluating means determines whether the target value of the target muscle indicated by the muscle specifying information acquired by the acquiring means satisfies at least the equation (i), thereby evaluating the feasibility of the target value.

It is preferable that the driving force calculating device further includes: target value calculating means which, when the target value evaluating means has evaluated that the target value acquired by the acquiring means satisfies at least the equation (i), calculates a target value of muscle force produced at the time when the motion is produced by a non-target muscle without assistance or resistance of the power assisting device, in accordance with the target value of muscle force to be produced by the target muscle indicated by the muscle specifying information, the estimated values, and the three-dimensional structural information, the non-target muscle being a muscle other than the target muscle and a muscle out of the muscles involved in the motion.

With the above arrangement, the target value calculating means calculates, in accordance with the estimated values and the three-dimensional structural information, a target value of muscle force produced by the non-target muscle at the time when the motion of the joint is produced under assistance or resistance of the power assisting device.

Thus, in addition to the target value of the target muscle acquired by the acquiring means, the target value of muscle force produced by the non-target muscle is determined. Through the use of these target values, it is possible to calculate driving force of the driving section which force ensures muscle force of the target muscle to be close to the target value. In other words, this arrangement eliminates the need for repeated inputs of target values of the target muscle by user's trial and error, unlike the invention disclosed in International Publication 2006/092872 pamphlet.

Further, the technical scope of the present invention encompasses: a driving force calculating program for operating the driving force calculating device and causing a computer to function as the foregoing means; and a computer-readable storage medium storing the driving force calculating program.

Specific embodiments or examples implemented in the description of the embodiments only show technical features of the present invention and are not intended to limit the scope of the invention. Variations can be effected within the spirit of the present invention and the scope of the following claims.

What is claimed is:

1. A driving force calculating device for calculating a driving force of a driving section of a power assisting device which section is fixed to bones producing motions through corresponding muscles across a joint between the bones, so that the power assisting device assists and/or resists a skeletal motion of the joint, the driving force calculating device comprising:
   acquiring means which acquires (a) muscle specifying information that specifies a target muscle, and (b) a target value of muscle force to be produced by the target muscle indicated by the muscle specifying information at the time when the motion is produced under assistance or resistance of the driving section, the target muscle being a muscle of which function is assisted or resisted by the driving section; and
   target value evaluating means which acquires (i) estimated values of muscle forces of muscles involved in the motion without assistance and resistance of the driving section and (ii) three-dimensional structural information indicative of relative positions of muscles and bones of a living body, and evaluates feasibility of the target value of the target muscle indicated by the muscle specifying information in accordance with the estimated values and the three-dimensional structural information.

2. The driving force calculating device according to claim 1, wherein the target value evaluating means determines whether there exists at least one free parameter $\alpha$ corresponding to the target value, and evaluates that the target value is unfeasible if the free parameter $\alpha$ does not exist.

3. The driving force calculating device according to claim 2, wherein
   the target value evaluating means determines whether the target value satisfies at least the following equation (1):

$$\text{rank}(A_{u1}) = \text{rank}([A_{u1} \Delta q_{d1}]) \quad (1)$$

where $\Delta q_{d1}$ is difference between the target value and muscle force required for rotation of the joint without wearing of the power assisting device, and $A_{u1}$ is distance between a center of the joint on which the target muscle exerts force and a part of the bone to which the target muscle is attached.

4. The driving force calculating device according to claim 1, further comprising:
   target value calculating means which, when the target value evaluating means has evaluated that the target value acquired by the acquiring means is feasible, calculates a target value of muscle force produced at the time when the motion is produced by a non-target muscle without assistance or resistance of the power assisting device, in accordance with the target value of muscle force to be produced by the target muscle indicated by the muscle specifying information, the estimated values, and the three-dimensional structural information, the non-target muscle being a muscle other than the target muscle and a muscle out of the muscles involved in the motion.

5. A power assisting device comprising a driving section which is fixed to bones producing motions through corresponding muscles across a joint between the bones, so as to assist and/or resist a skeletal motion of the joint, the power assisting device further comprising:
   the driving force calculating device according to claim 1,
   wherein the driving section produces a driving force calculated by the driving force calculating device.

6. A driving force calculating method of a driving force calculating device for calculating a driving force of a driving section of a power assisting device which section is fixed to bones producing motions through corresponding muscles across a joint between the bones, so that the power assisting device assists and/or resists a skeletal motion of the joint, the method comprising:
   acquiring step of acquiring (a) muscle specifying information that specifies a target muscle, and (b) a target value of muscle force to be produced by the target muscle indicated by the muscle specifying information at the time when the motion is produced under assistance or resistance of the driving section, the target muscle being a muscle of which function is assisted or resisted by the driving section; and
   target value evaluating step of acquiring (i) estimated values of muscle forces of muscles involved in the motion without assistance and resistance of the driving section and (ii) three-dimensional structural information indicative of relative positions of muscles and bones of a living body, and evaluates feasibility of the target value of the target muscle indicated by the muscle specifying information in accordance with the estimated values and the three-dimensional structural information.

7. A computer-readable storage medium, when run on a computer, configured to instruct the computer to perform the method of claim 6.

* * * * *